April 25, 1933.　　W. L. WRIGHT ET AL　　1,905,615
HOOD CAPPING CONTAINER
Filed Dec. 12, 1927　　10 Sheets-Sheet 6
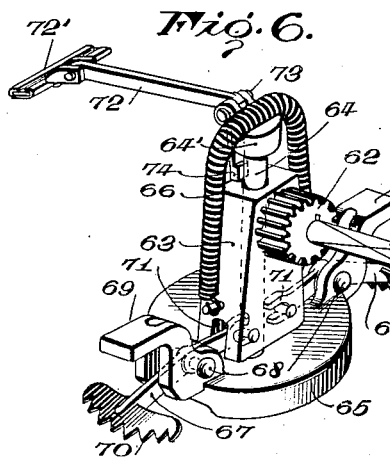
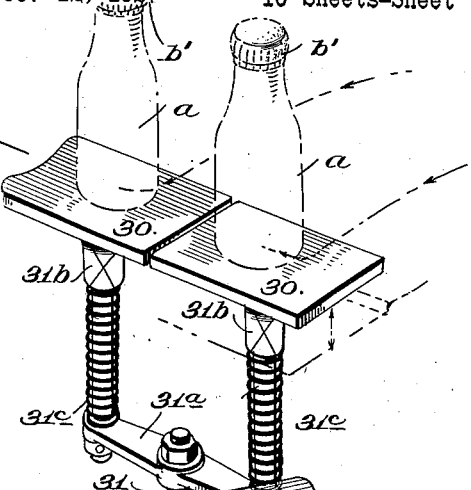
INVENTORS
W. L. Wright
L. N. Pierce
Hubert Peck
ATTORNEY.

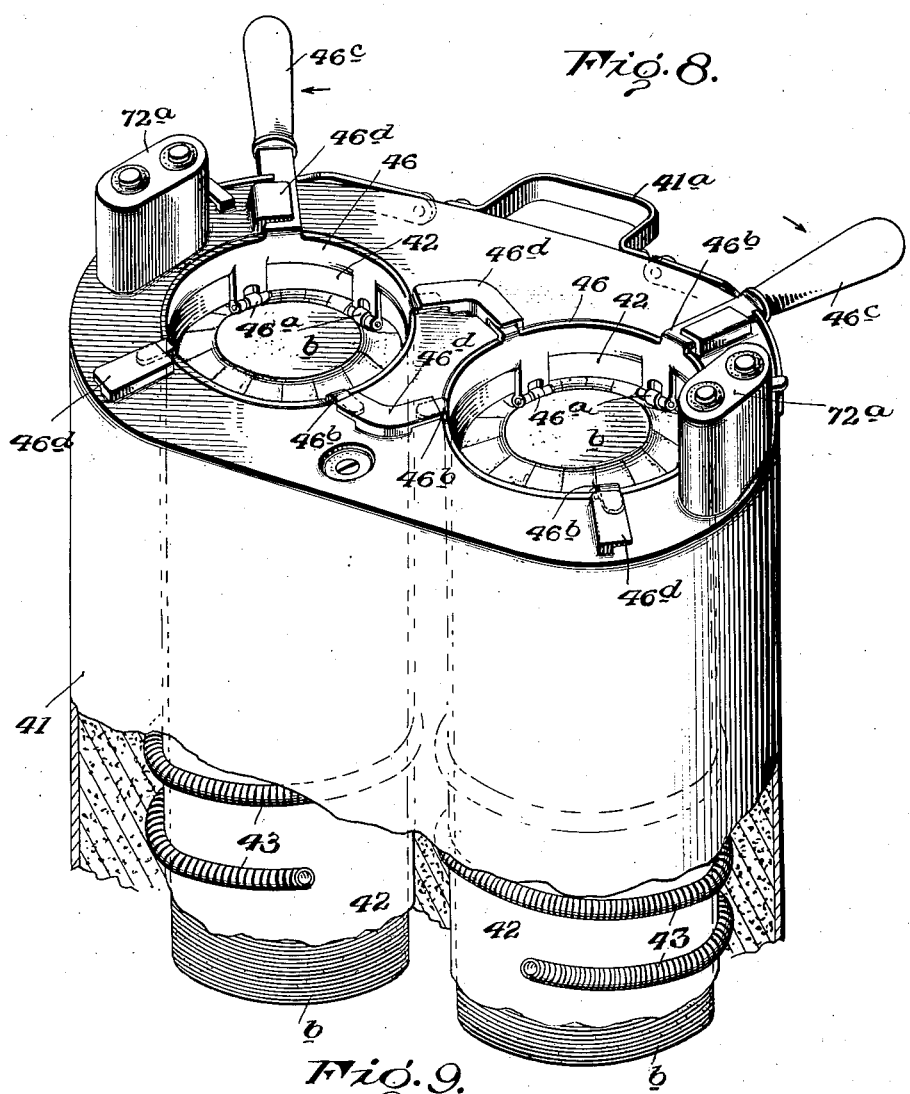
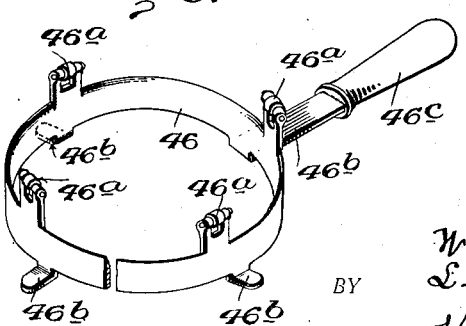

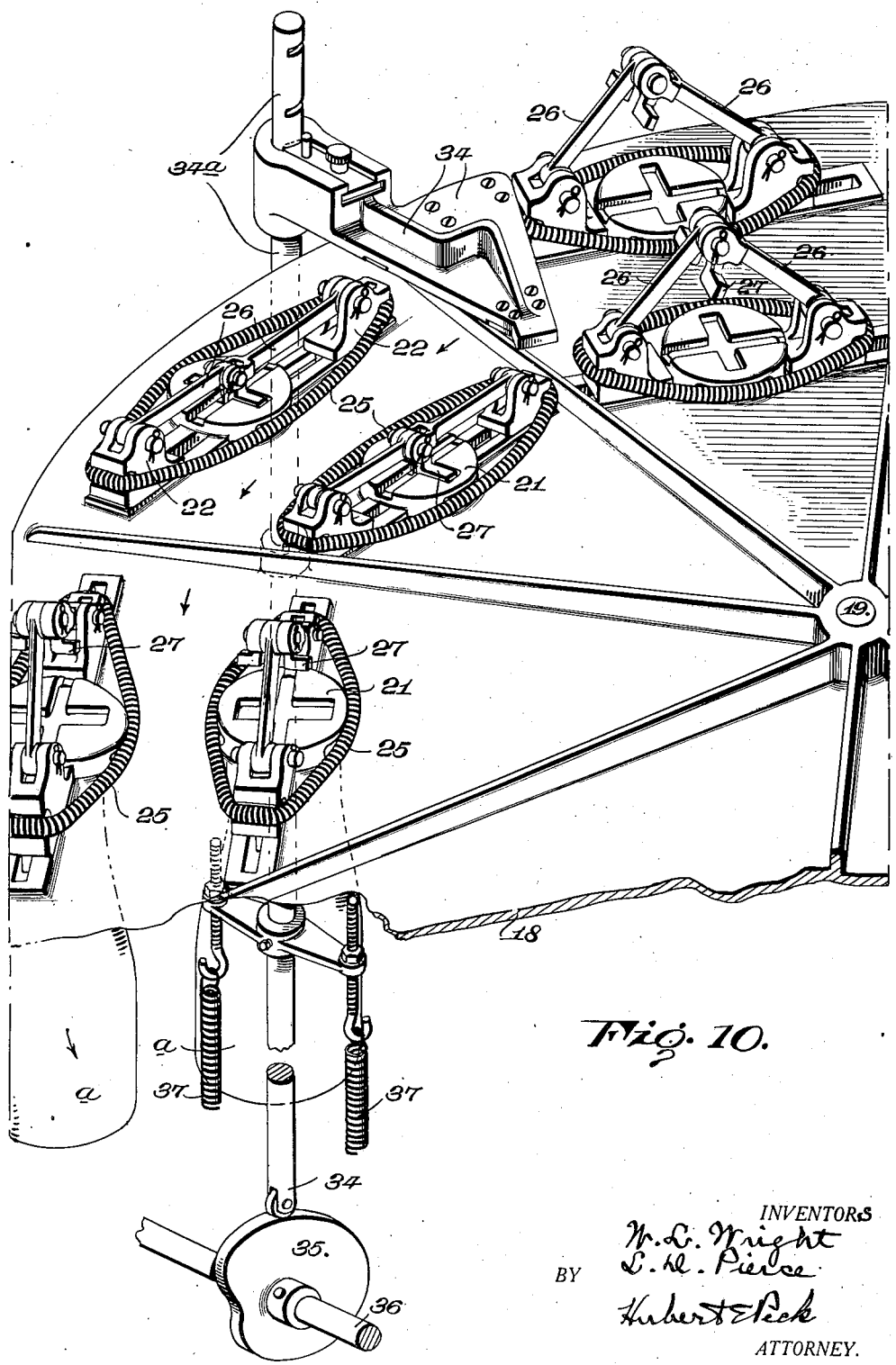

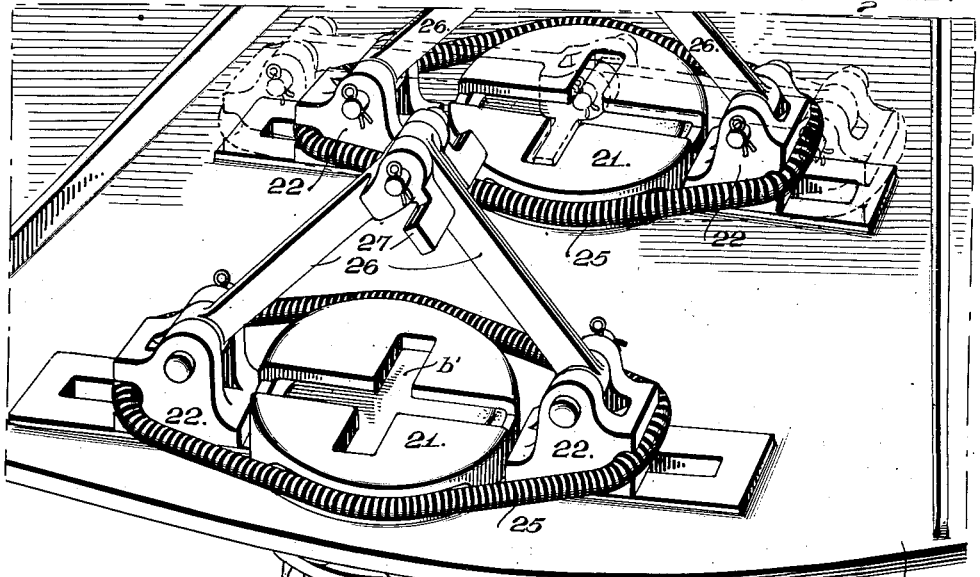
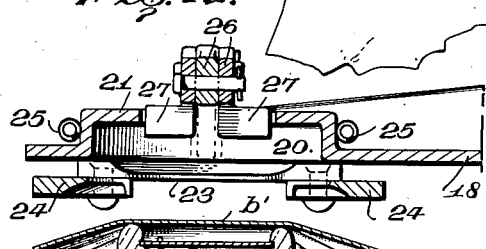
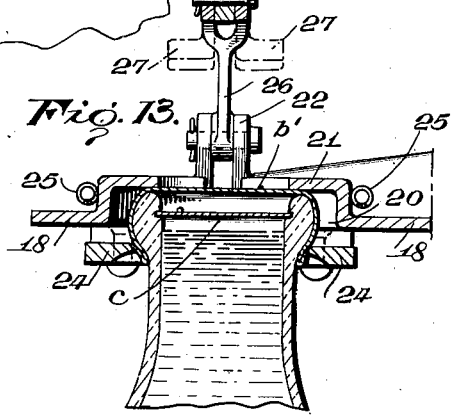
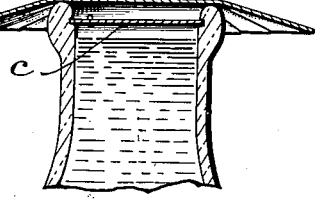

Patented Apr. 25, 1933

1,905,615

UNITED STATES PATENT OFFICE

WILBUR L. WRIGHT AND LEE D. PIERCE, OF FULTON, NEW YORK, ASSIGNORS TO OSWEGO FALLS CORPORATION, OF FULTON, NEW YORK, A CORPORATION OF NEW YORK

HOOD CAPPING CONTAINER

Application filed December 12, 1927. Serial No. 239,538.

This invention relates to the method of and apparatus for capping containers, and, in its specific aspects provides mechanisms for receiving filled bottles from filling machinery; maintaining a supply of paper material binder-carrying flared skirt hood cap disks in a temporarily moldable condition; quickly depositing moldable disks from said supply onto the bottle heads; drawing such moldable disks down on the bottle heads and molding the same thereto under the bottle rims and thus tightly holding the disks until set to stiff hood cap securing condition; discharging such hood capped bottles for off bearing; feeding and advancing the bottles; making quick and easy adjustments to adapt the machinery to runs of bottles of different sizes, such as half pints, pints, and quarts; and for other particular and peculiar purposes; and the objects and nature of the invention will be readily understood by those skilled in the art in the light of the following explanations of the accompanying drawings that show what we now believe to be our preferred mechanical expressions or embodiments from among other forms, constructions, combinations and arrangements, within the spirit and scope of our invention.

An object of the invention is to improve the constructions illustrated by certain of our prior patent applications relating to means for and methods of capping containers, namely;—

Ser. No. 58,613, filed September 25, 1925;
Ser. No. 58,780, filed September 26, 1925; and
Ser. No. 118,056, filed June 23, 1926.

A further object of the invention is to provide various improvements in constructions, features, and arrangements with the end in view of producing hood capping apparatus of maximum efficiency, speed, and adaptability.

With the foregoing and other objects in view our invention consists in certain steps in the art of hood capping containers, and in various new features and combinations and arrangements as more fully and particularly set forth and specified hereinafter.

Referring to the accompanying drawings, forming a part hereof:—

Fig. 6 is a detail detached perspective of one of the cap transfer heads.

Fig. 7 is a detached detail somewhat diagrammatical perspective view of the cushioned bottle stands or supports at the cap receiving station, and of vertically movable bottle supports and stools and, in part, the operating means therefor.

Fig. 8 is a detail detached perspective of the heater and container for the supply of moldable hood caps, partially broken away, and in reversed position to show the discharge mouths thereof, the bottom caps therein and the removable cap supports in operative positions.

Fig. 9 is a detail detached perspective of one of the removable supports for the supply of caps in a magazine of the heater.

Fig. 10 is a fragmentary detail perspective of a portion of the rotary table carrying the cap molding and holding and bottle carrying devices, and of the device for opening said devices for release of the capped bottles, also showing in part the means for raising and lowering said device.

Fig. 11 is a detail perspective of a portion of the structures illustrated by Fig. 10 showing a set of said devices carrying bottles and holding the hood caps thereon pressed to securing positions.

Fig. 12 is a detail vertical section through a portion of the rotary table showing a capped bottle head receiving mouth thereof with the clamping device at said mouth in opened position to receive the bottle head and the flaring moldable paper hood cap disk thereon and shown in vertical section below said mouth.

Fig. 13 is a vertical section showing the assembly of Fig. 12, after the capped bottle head has entered said mouth and the device has moved to cap clamping and bottle carrying position.

Fig. 14 is a detail fragmentary perspective showing the blades or jaws of the clamp in clamping position on a hood capped bottle head shown by dotted lines.

Figure 1:
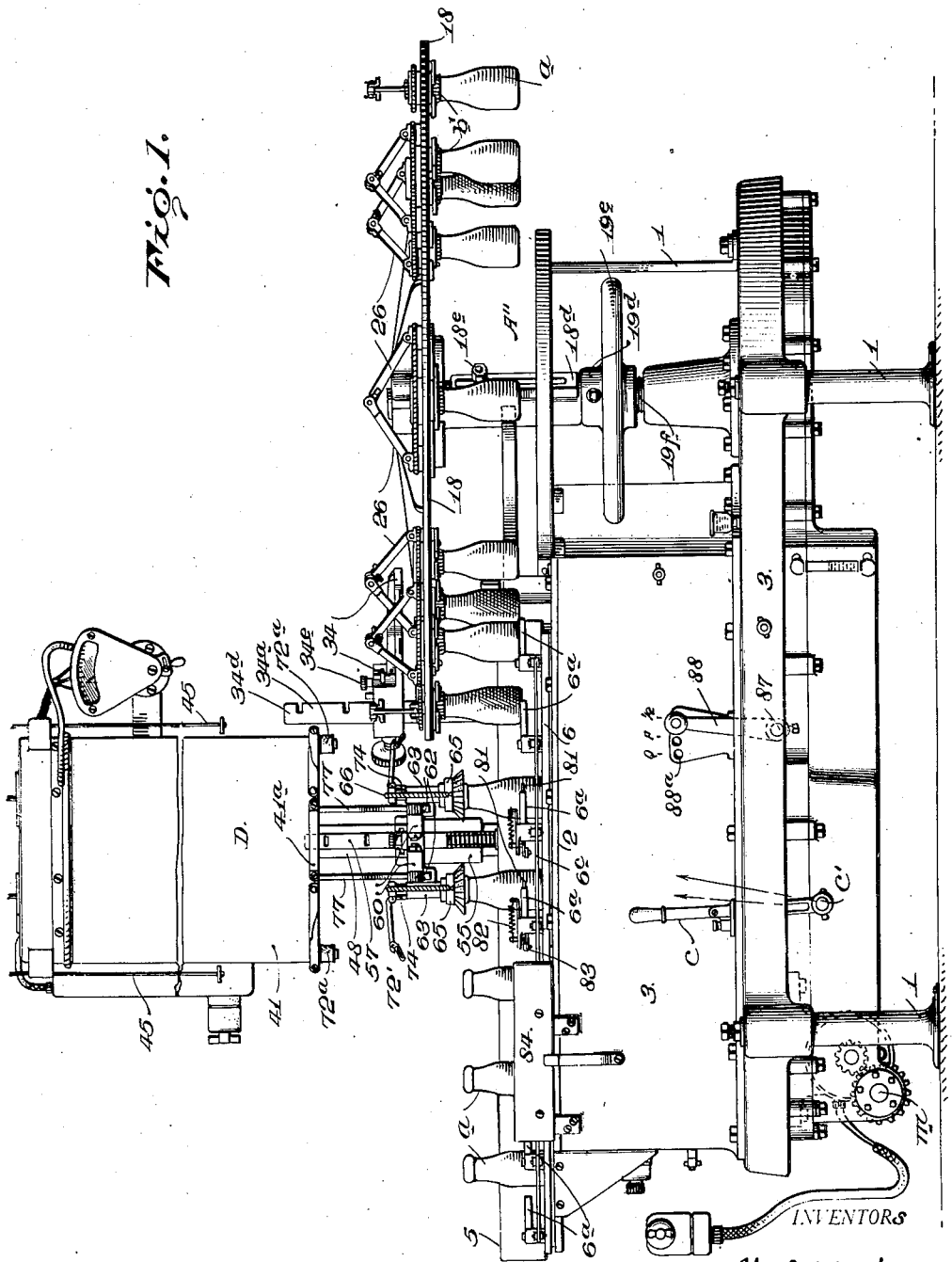
Fig. 1 is a front elevation of apparatus embodying our invention, bottles being shown at various stages of the cap applying and molding operation.
Figure 2:
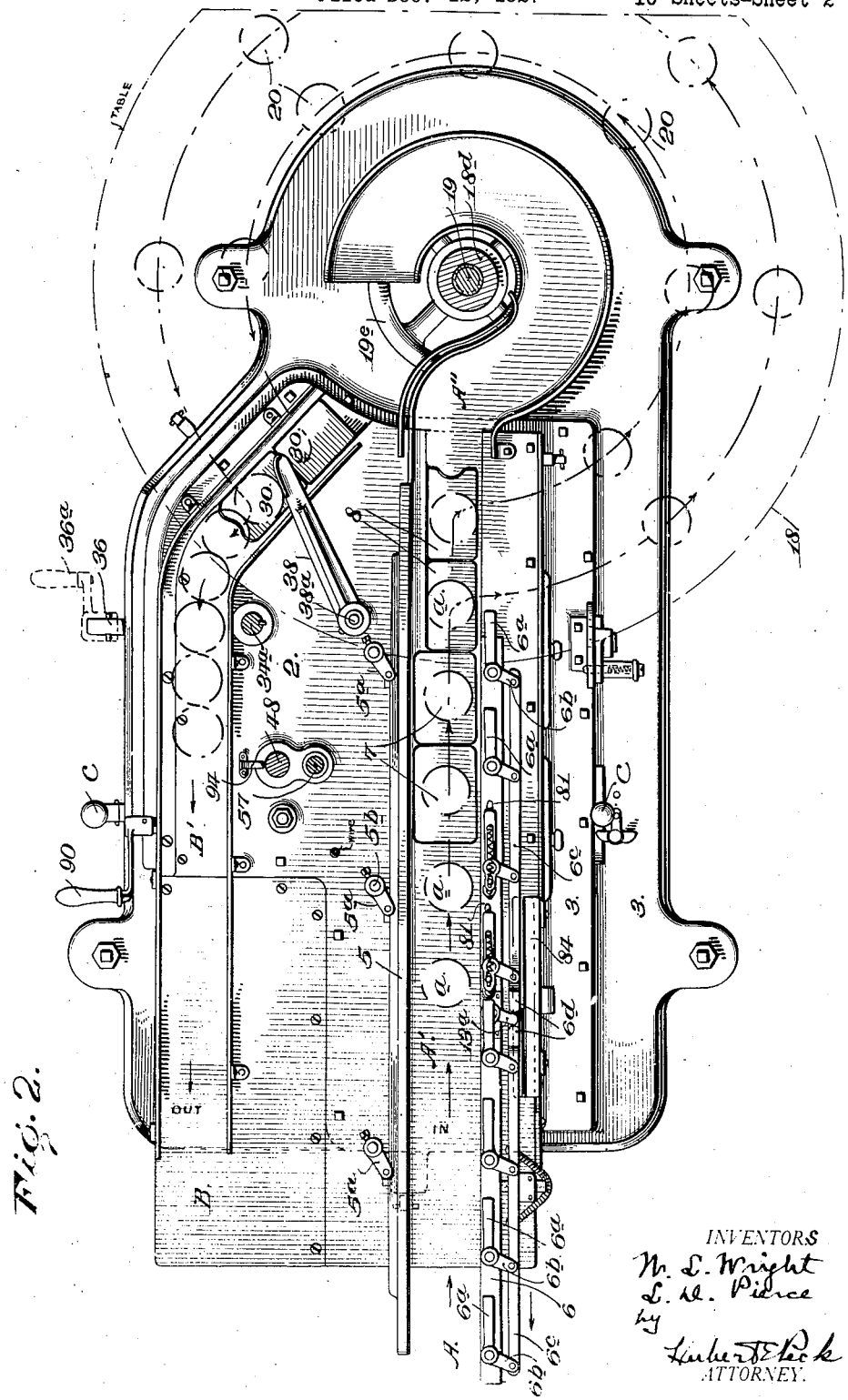
Fig. 2 is a sectional top plan of the apparatus of Fig. 1, dotted lines indicating the paths traveled by the bottles, the bottles being indicated by dotted circles.

In the example illustrated, the filled bottles, usually closed by the common paper disks or milk caps, are received at the receiving end of the hood capping machine which happens to be the left hand end of the machine as it appears in Figs. 1 and 2 of the drawings. The bottles are thus received usually from the discharge end of a filling and capping machine such as commonly employed in milk bottling plants. These filling machines are usually very rapid in operation and commonly fill, cap and discharge upwards of fifty or sixty bottles per minute. It is desirable that the hood capping machine be capable of hood capping and discharging the hood capped bottles at least as fast as the bottles are received from the filling machine, and hence take care of the output from the filling machine and avoid congestion of filled bottles awaiting hood capping.

Among other features, our invention involves improvements, whereby filled bottles are handled in sets, for instance sets of two, so that moldable hood cap disks are simultaneously applied to two bottles, and the hood caps are then simultaneously molded and held on said two bottles until set, and the two hood capped bottles are simultaneously discharged at the hood capping machine outlet. We are thereby enabled to provide a bottle feed operating at a speed to remove the filled bottles from the filling machine as rapidly as they are discharged by that machine, without operating the cap transfer and molding mechanisms of our machine at undesirable high speeds and without employing a rotor or revolving table for the cap clamping and bottle carrying devices of excessive diameter.

In the drawings, we show any suitable supporting frame 1, for a usually flat top or table 2, and for a preferably closed elevated gear box or casing 3, arranged under the table.

The table provides top longitudinally elongated separate passageways for the incoming and outgoing bottles, and the filled bottles to be hood capped enter from the bottle filling machine at A, and the hook capped bottles are discharged at B, both at the left hand end of the table 2, so far as the illustration Figs. 1 and 2, are concerned.

A slideway A', for the bottles to be hoodcapped, extends longitudinally of and along the table from the bottle inlet A, past the hood cap receiving and molding stations. The floor of this slideway is in major part formed by the table on which the bottles rest and along which they slide. The rear longitudinal boundary of the slideway is formed by a longitudinal upright normally-fixed bottle guide plate or wall 5. The front longitudinal boundary of the slideway is determined by the longitudinal reciprocatory slide bar 6, of the bottle feed mechanism. In the example shown, the hood cap receiving station is located below the overhanging elevated holder and heater D, (referring to Fig. 1) for the supply of hot moldable hood caps, and at said station, the floor of the slideway includes one or more cushioned or yieldingly upheld individual bottle supports or stools 7. In the example shown, we show two separate stools 7, arranged side by side below the heater and holder D, and each arranged to uphold a bottle. The top surfaces of these stools 7, are normally flush with the floor of the slideway, and each stool is yieldingly upheld or cushioned, by any suitable means, to yield downwardly under excessive downward pressure on the bottle on the stool, to compensate for varying vertical lengths of the bottles of a run. For instance, we show the two stools arranged side by side in a vertical opening in the table and independently yieldingly upheld by springs 7a, supported by suitable hangers from and below the table.

At the right portion of the slideway, Fig. 2, at the next bottle feed step beyond the stools 7, we provide one or more bottle elevators 8, by which the bottles from the cap receiving station, the stools 7, are elevated for removal and hood cap molding or clamping. In the particular example illustrated, we show a pair of simultaneously operating elevators 8, normally located in lowered position flush with the floor of the slideway so that the two bottles can slide from stools 7, onto the two elevators 8, for subsequent elevation, as hereinafter described. The elevators 8, rise and fall together and normally occupy a vertical opening through the table, and are carried by a vertical slide 9, within the casing 3, upheld and elevated by a vertical rotary cam 10, carried by rotary shaft 11, and at its upper end having cross head 9a, through which the depending shanks 8a, of the elevator platforms 8, are freely slidable vertically. Each elevator platform 8, is yieldingly upheld from and supported by cross head 9a, through the medium of cushioning springs 8b, so that the elevator platforms 8, can independently yield vertically to compensate for varying vertical lengths of bottles.

If so desired, the slideway A', can be extended at A", beyond the elevators 8, for the reception and collection of bottles without hood caps or with defective hood caps or otherwise, that have not been removed from the elevators 8, by the bottle removing and hood cap clamping mechanism, and that consequently will be pushed forward from elevators 8, into said slideway extension A", as will hereinafter appear.

Suitable feed mechanism is provided to advance the filled bottles received at A, from the filling machine or otherwise, step by step along the slideway A', and in the example shown, this feed mechanism comprises the elongated slide 6, arranged parallel with the slideway A', and slidably supported and guided on the table to reciprocate longitudinally. This long slide 6, carries a series of uniformly spaced bottle pushing fingers 6a, arranged longitudinally of the slide and mounted thereon on vertical pivots to swing horizontally to and from positions over the slide and out of the bottle slideway and bottle pushing positions extending transversely into the slideway. Each finger 6a, is provided with a controlling elbow or lateral arm 6b, fixed thereto, and the free ends of these arms are pivotally joined to and connected by a common link 6c, carried by said arms, and whereby the pusher fingers are swung simultaneously to and from and held in operative and inoperative positions.

Figure 3:
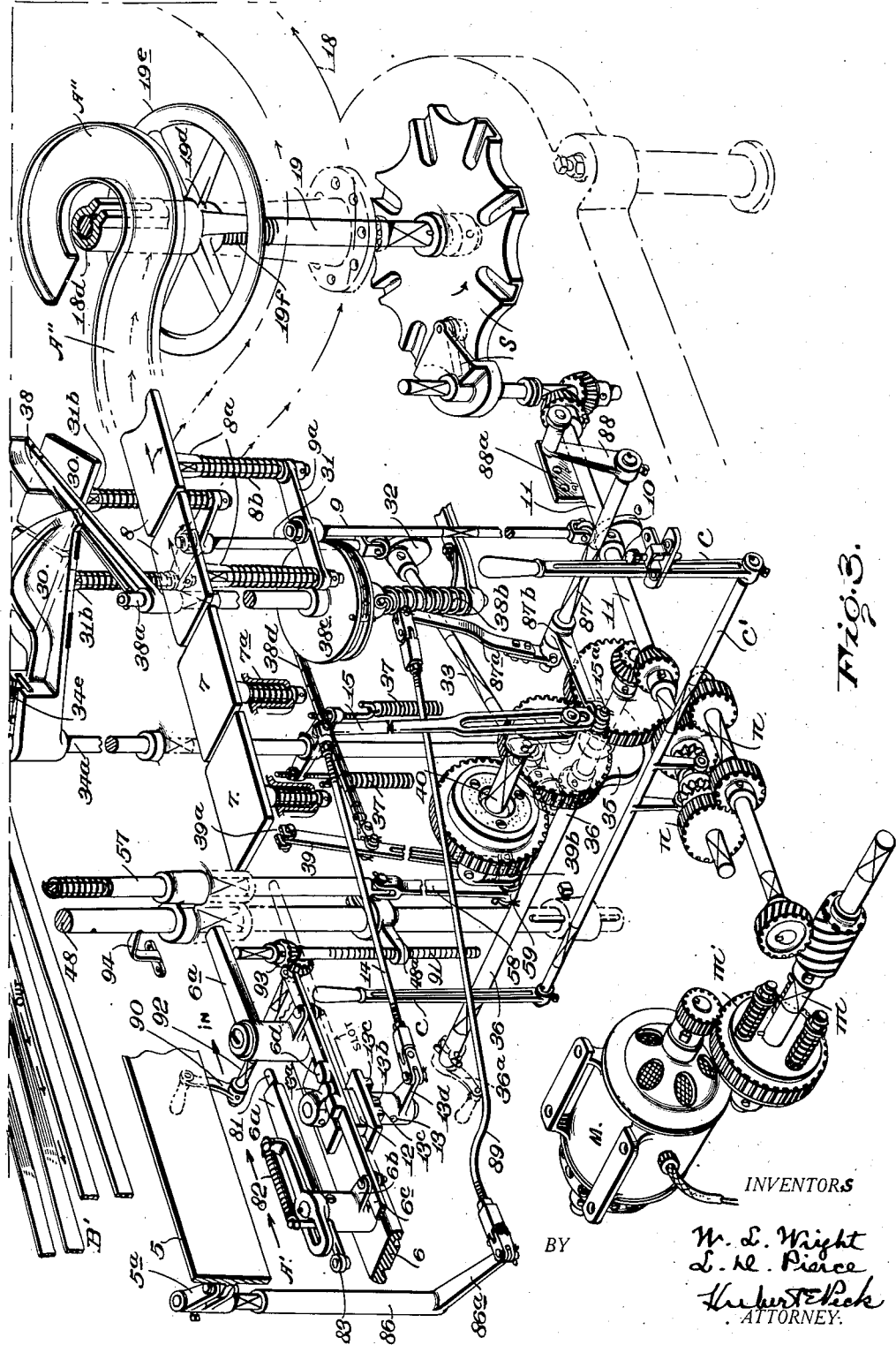
Fig. 3 is a detail diagrammatical perspective of the actuating and timing mechanism for various operating parts, and certain adjusting means, certain parts being broken away.
Figure 4:
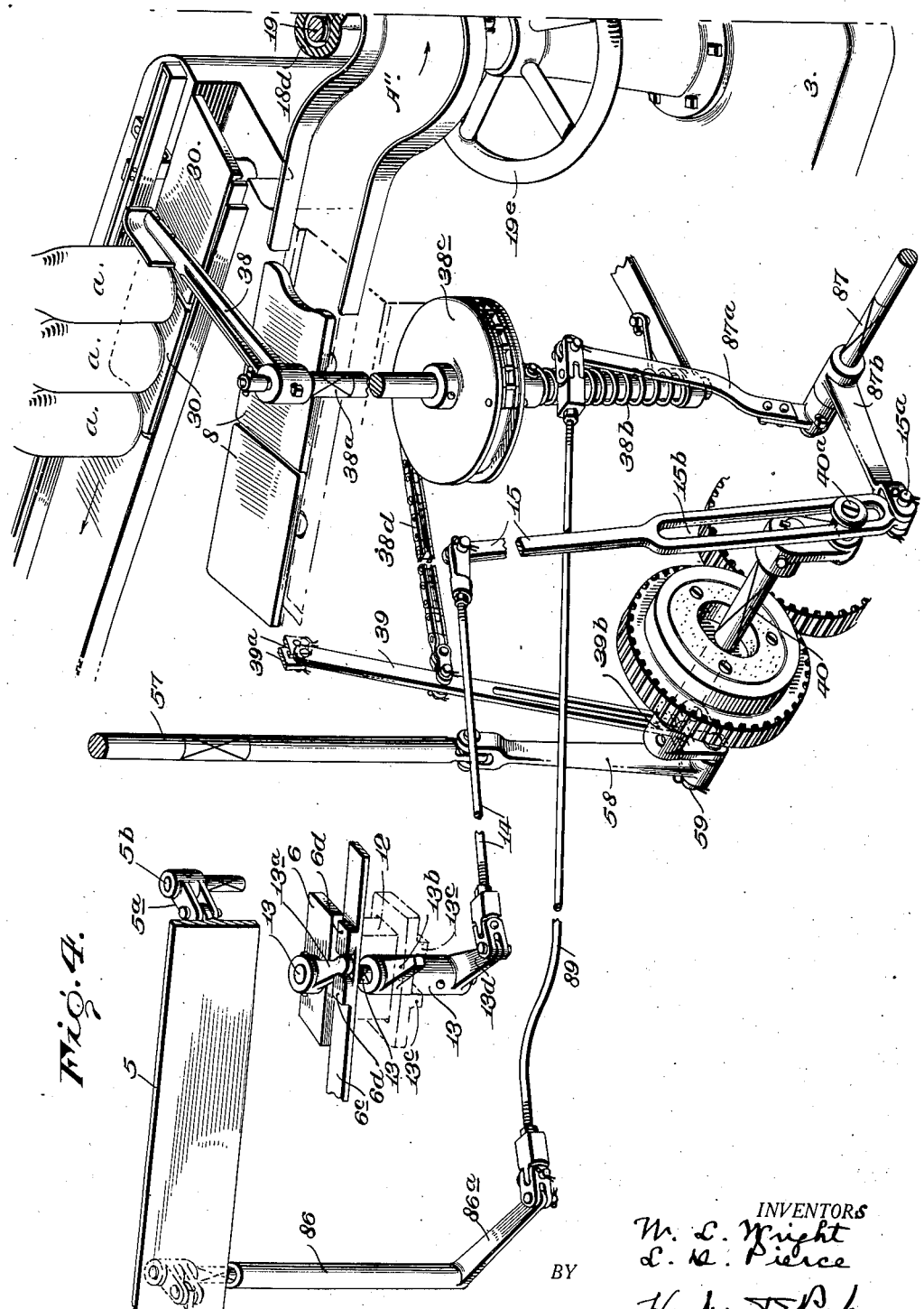
Fig. 4 is a detail diagrammatical perspective showing in part certain bottle advancing means and the driving devices therefor, and means for adjusting the position of the bottle guide or back plate, parts being broken away.

The slide 6, is formed with a block 12, (Figs. 3 and 4) rigid therewith and depending therefrom into the gear case 3, through an elongated slot in the table 2, and parallel with the slide. A vertical rock shaft 13, extends through this block and is mounted to rock therein on a vertical axis. At its upper end above slide 6, this rock shaft is provided with a lateral arm or nose 13a, rigid therewith, and extending forwardly over link 6c, with its rounded free end loosely confined between a pair of abutments 6d, rigid with said link, in such manner that when the shaft 13, carried by slide 6, is rocked in one direction the nose 13a, will rock therewith and move the link 6c, longitudinally to swing the fingers rearwardly transversely of the bottle slideway to bottle pushing position; and when said shaft 13, is rocked in the opposite direction, the nose 13a, will swing to move link 6c, in a direction to withdraw the fingers 6a, to inoperative positions as shown in Fig. 2. The swing of nose 13a, and the independent rocking movement of shaft 13, in slide 6, are limited by radial stop arm 13b, rigid with shaft 13, movable between spaced stops 13c, rigid with block 12, that is fixed to slide 6.

The entire feed mechanism is actuated by a pitman or push and pull link 14, in case 3, pivotally coupled to a crank arm 13d, rigid with the lower end of rock shaft 13. The pitman 14, forms the operating connection between the feed mechanism and an upright vertically swingable operating arm or lever 15, arranged in case 3, and driven and controlled as hereinafter set forth, to swing the slide 6, on its return stroke, toward the left Fig. 2, with the pusher fingers withdrawn to clear the bottles, and then to swing the slide on its bottle advancing stroke with the pusher fingers extending transversely of the slideway to engage and push the bottles.

The independent rocking movement of shaft 13, limited by the play of shaft arm 13b, between stops 13c, at the beginning of each operative stroke of pitman 14, is utilized to throw the pusher fingers 6a, to either operative or to inoperative positions before the slide 6, starts on its bottle advancing or return strokes.

Whenever the slide 6, completes a stroke and comes to rest, the arm 13b, of shaft 13, will be in engagement with one of the stops 13c. After an interval of rest, the pitman 14 will start moving to start the slide 6 on the opposite stroke but before the slide moves, the shaft 13 must rock to carry the arm 13b, through its range of lost motion from one stop 13c, to the other before the slide begins its return stroke, and it is this lost motion movement of shaft 13, at the beginning of each stroke of pitman 14, that is utilized to swing the bottle pusher fingers to either operative or inoperative positions before the slide 6, actually begins its stroke. The arrangement is such that when the slide 6, stops at its limit of bottle advancing stroke, toward the right Fig. 2, the parts will come to rest with the pusher fingers extending into operative positions in the slideway, and when the slide stops at its limit of return stroke (toward the left Fig. 2) the fingers will be at rest in inoperative positions. Hence, before the slide 6, actually starts on its feed stroke, the fingers will be first swung out to bottle pushing positions, and before the slide begins to move on its return stroke the fingers will first move to inoperative positions.

This arrangement permits the fingers to positively space and locate the bottles in a predetermined manner as required by the arrangement and location of the stools 7, and elevators 8, particularly where several bottles are handled as one unit, in the reception of caps, and in delivery to the hood cap clamps. For instance, in the example illustrated, we handle two bottles at a time as one unit, i. e. the pusher fingers are so arranged and each stroke of the slide 6 is so regulated, that at each bottle advancing stroke, two properly spaced bottles are advanced to and left at rest on the stools 7, and two properly spaced bottles are removed from stools 7 and left at rest on elevators 8, and if one or more bottles have been left on elevators 8, such bottles are pushed therefrom by the advancing bottles and left in extension A".

The bottles of the unit or group (two bottles, in this example) carried by the stools 7, at the hood cap receiving station, have hood caps simultaneously deposited on their heads, by suitable mechanism hereinafter described, while said bottles are at rest on said stools, during the return stroke of the hereinbefore described reciprocatory feed mechanism that advances the groups of bottles step by step along the feed or slideway A'.

On the next operative stroke of said reciprocatory feed mechanism, said unit or group of bottles carrying the moldable hood caps on their heads, is advanced to and deposited on the bottle elevators 8, one bottle on each elevator, which in the particular example illustrated, constitute a part of the mechanisms whereby the bottles are advanced from the bottle inlet A, to the bottle outlet or discharge B.

On the next inoperative or return stroke of said reciprocatory feed mechanism, the bottles on the elevators are simultaneously delivered (in this example by being elevated or lifted) to the next bottle advancing mechanism, which in this particular example embodies a carrier that advances step by step and is provided with successive groups of bottle clamps or holders constructed to grasp the bottles under the rims of their heads and contract the moldable hood cap skirts to and under said rims and thus hold the same until set to hood cap securing condition, and carry the bottles throughout the length of an extended path and then deliver the hood capped bottles for off taking. This last mentioned bottle carrying and hood cap securing or sealing mechanism, is in this example, also constructed and arranged to handle the bottles in units or groups, to speed up capacity, without excessive speed of moving parts. This mechanism provides a carrier having an endless series of groups of individual bottle holders formed to press the caps to securing position on the bottles, and this carrier is so constructed and arranged as to always present a group of such holders arranged to secure the capped heads of the bottles of the group elevated by the elevators 8, so that the cap-carrying heads of the elevated bottles of the group will be simultaneously grasped, and on the next advancing movement said bottles will be carried forward and another group of holders presented above the bottle elevators. In the particular example illustrated, this last mentioned bottle carrying and hood cap securing mechanism comprises an elevated horizontal rotor or disk 18, carried by a supporting sleeve on a vertical shaft 19, constituting the vertical axis on which the disk is horizontally rotatable step by step. This shaft extends above and down through the end portion of the table and into the end extension of the lower part of casing 3, wherein it is mounted and provided with driving and controlling mechanism as hereinafter explained. The bottles advance in a straight line, one behind the other, in the feed or slideway A', and the shaft or axis 19, of rotation of disk 18, is arranged in line with the longitudinal axis or length of slideway A', and spaced laterally a distance from the bottle elevator represented in this instance by the two vertically movable bottle supports 8. The rotor or disk 18, is of a diameter and elevation to overhang said bottle elevator 8, and be located a distance above said elevator when in its normal depressed position that exceeds the lengths of the bottles on the elevator. The rotor or disk 18, is formed with an annular series of similar groups of uniformly spaced bottle head receiving mouths 20, open at the bottom of the disk, and in the example shown, the similar mouths of each group, are similarly spaced and arranged side by side in a radial line with respect to the axis of rotation of the disk 18. The spacing between the mouths 20, of each group, is the same as the spacing between the bottles on the twin elevator 8, i. e. between the bottle positions on the two bottle supports 8, and the radial distances between the mouths of the groups and the disk axis 19, is in this example, the same as the straight line distances from axis 19, and the two bottle supports of the twin elevator 8. Hence, the disk 18, can be rotated to successively bring the groups of mouths 20, above and in approximately exact vertical alinement or registration with the bottles on the twin elevator 8, so that the two bottles on the elevator can be simultaneously elevated the necessary distance to simultaneously enter their heads in the two mouths of a group for simultaneous clamping and holding by the mechanism with which each mouth is provided.

Means hereinafter explained, is provided for advancing the disk 18, step by step to successively present the groups of mouths 20, at the bottle head receiving position, and for stopping and holding the disk after each step forward, with the mouths of a group at the bottle head receiving position, in direct alinement and registration with the twin elevator 8, and the disk comes to rest and is held with such mouths in said position before the twin elevator makes its upward bottle delivering stroke. The disk 18, makes its advancing steps while the reciprocatory bottle feed in slideway A', is making its bottle advancing stroke.

The formation of the disk 18, to provide a bottle head mouth 20, and the bottle supporting and hood cap pressing and holding device carried by the disk at such mouth, is approximately the same as illustrated by and claimed in our copending application Ser. No. 58,780, filed Sept. 26, 1925. Each mouth 20, is formed by an open bottom socket or recess in the disk 18, having an elevated top wall 21, forming a presser head or abutment against which the top of the hood cap is pressed by the top edge of the bottle head in the socket. The bottle holding and hood cap skirt pressing mechanism at said mouth comprises an expansible and contractile ring of overlapping loosely joined members arranged at the under side of the disk surrounding and approximately concentric with the mouth 20. This ring is hung from the disk by two slides 22, on the upper side of the disk, with the mouth between them, the slides being movable in opposite directions radially with respect to the mouth. The slides 22 have necks depending through vertical slots in the disk, and the opposing U-shape jaw members 23, of said ring are fixed to said necks, respectively, at the under side of the disk and opposite sides of the mouth. The opposite corners of the two jaws 23, of the ring support and loosely carry the intermediate opposite link jaw members 24, that complete the circle of the ring clamp and bottle holder that surrounds the mouth 20. The two slides are constantly pressed toward each other by a suitable retractive spring 25, that exerts a constant tendency to close the ring clamp 23, 24. The two slides 23, are connected by a toggle arranged at the disk top above the mouth wall 21, and consisting of two links or levers 26, at their outer ends pivotally joined to the slides, respectively, to swing vertically, and these two links are pivotally joined at their inner ends to form the knuckle of the toggle located centrally above the wall 21, and carrying a toggle breaking or releasing finger 27, adapted to depend through a slot in wall 21, into the path of the hood cap on the bottle head entering the mouth 20, to lift and break the toggle. The toggle is provided to control the expansion and contraction of the clamping ring 23, 24. When the toggle knuckle is pressed down to straighten out the toggle, the jaws 23 are separated and the clamping ring is expanded, and the ring is locked in expanded (opened) bottle head receiving or releasing position, when the toggle is pressed down beyond dead center and approximately against the top wall 21. The clamp rings are all thus locked in expanded position, when the mouths 20, thereover are over the twin bottle elevator 8. When the twin elevator, elevates the bottles, the bottle heads carrying the moldable skirt hood cap disks, enter the expanded clamp rings and pass up therethrough into the bottle mouths, and through the medium of fingers 27, the toggles are broken upwardly, and the springs 25, cause quick contraction of the ring clamps which close and contract around the cap skirts forming and pressing said skirts to the reduced diameter portions of the bottles below the rims of the bottle heads, whereby the bottles can be held and supported by said clamps thereby suspended from their heads. The clamps fold the cap skirts down and gather the skirt annularly in under the bottle head rim and thus press the skirts complete around the circle thereof inwardly and radially against the bottle neck below the rim and thus hold the same until set to stiff hood cap securing condition. Also, as the clamping ring closes in on the cap skirt and bottle before the bottle has fully completed its upward movement, the spring pressed contracting clamping ring functions to pull downwardly on the cap to pull and hold the cap tightly down on the top edge and rim of the bottle mouth.

Although we do not wish to so limit our invention, in the example illustrated, the toggle breaking fingers 27, are so arranged as to constitute hood cap disk finders, and detect the presence of hood caps on or their absence from the bottle mouths entering the mouths 20, of the bottle conveying disk 18, and hence refuse to grasp a bottle head that does not carry a hood cap. The refused bottle, not equipped with a hood cap disk, will hence descend with the bottle elevator 8, from the bottle conveying disk 18, and on the next bottle advancing stroke of the reciprocatory bottle feed fingers 6a, will be thereby discharged into the discarded bottle extension A'', of the bottle slideway. To accomplish the result described, the detector toggle breaking fingers 27, are located to strike the central portion of the top wall of the hood cap disk on the ascending bottle head, at a point or points within and remote from the circle of the top edge of the bottle mouth or rim, as distinguished from an arrangement of such finger which causes the surrounding top edge of the bottle mouth to strike and lift the finger to break the toggle whether or not a hood cap is on the bottle head.

At each upward stroke of the twin elevator 8, the bottle conveying rotor 18, receives therefrom two hood capped bottles grasping and holding the bottles suspended from their heads; the rotor then moves forward a step and comes to rest to simultaneously receive and carry two more bottles and so on in endless succession, as two bottles that have completed the circuit and the hood caps of which are set in secured condition, are dropped or delivered from the bottle conveying rotor, after each rotor advancing step and at the same time that two more bottles are delivered to and taken on by the rotor.

We find it to be desirable to hold the moldable skirts of the hood caps on the bottle heads tightly to securing position contracted and pressed radially under the bottle heads, for a considerable length of time or until said skirts have thoroughly cooled or otherwise set to their permanent or fixed hard or stiff securing condition. To avoid seriously slowing up the output of our apparatus and method, we have hence devised means (in this instance, the rotor and its endless series of groups of bottle holders and clamps) for carrying through a long path of movement, a multiplicity of bottles with their hood caps thus held until set, all in such manner that the apparatus can discharge hood capped bottles with sufficient rapidity to take care of the filled bottles received from the capping machinery.

The bottle carrying rotor 18, is arranged at an elevation with respect to machine parts thereunder, so that the multiplicity of bottles depending from and carried by the rotor can move forward in unobstructed horizontal approximately endless or circular paths of movement from the bottle receiving station to the bottle discharge station. We prefer to employ a bottle carrier, such as the rotor, that carries the bottles in approximately horizontal endless paths, as floor space is thereby conserved, and the bottles can be received from one end of the machine top table and carried through a long path for a considerable length of time and then discharged on a different portion of the same end of the table top.

For instance, in the particular example illustrated, we show a slide or guideway B', for hood capped bottles arranged longitudinally of the table 2, behind the feed way A', and extending from the right hand to the left hand end of the top with reference to Fig. 2. The bottle receiving end of this guide or slideway B', can be located closely behind the discharge end of guideway A, and is formed by or provided with a vertically movable carrier 30, for a unit group of hood capped bottles, two in this instance, and this twin bottle carrier, like the twin elevator 8, consists of a pair of horizontal adjacent flat bottle stools or supports 30, normally occupying an opening in the table flush with the floor of the bottle slideway B'. The two flat supports 30, are carried and elevated by a depending vertically-movable slide 31, at its lower end held to the working edge of a vertical rotary cam 32, on rotary shaft 33, by which the vertical position of the twin bottle support is controlled and by which it is periodically elevated. The slide 31, is provided with a rigid horizontal cross head 31a, through which the depending shanks 31b, loosely depend and from which the two supports 30, are yieldingly upheld by coiled expansion springs 31c, to afford the two supports 30, slight independent vertical cushioning or yielding to compensate for variations in bottle lengths. The two supports 30, are arranged side by side in a horizontal line radially of the rotor 18, and are vertically alined with the two circular paths in which the mouths 20, of rotor 18, travel. The stop and controlling mechanism actuating the step by step advance of the rotor 18, is so arranged that after each step advance, said rotor will always come to rest with a group (two in this instance) of mouths 20, over and vertically alined with the two bottle supports 30. In the particular example illustrated, the twin support 30, is located under the last stop made by each group of mouths 20, before reaching the bottle receiving stop over the twin elevator 8, thus the capped bottles are carried with their hood caps pressed and held for setting until the rotor has made a complete revolution, with respect to each set of bottles. The twin supports 30, are located at the rotor hood-capped bottle discharge or delivery station, and on the completion of each advancing step of the rotor 18, the twin supports 30, are elevated to receive two hood capped bottles from the mouths 20, over said support, and to then drop down to the level of the floor of slideway B', so that bottles can be pushed from said twin support and advanced along the slideway toward the discharge or delivery end thereof.

When the mouths 20, receive bottle heads, the toggles 26, break and project upwardly and the ring clamps controlled thereby snap to gripping positions around the cap skirts and bottle neck. The toggles thus remain in upwardly projecting positions while the bottles are carried by the rotor 18. The toggles must be depressed to expand the clamps and lock the clamps in expanded positions, to release or discharge the hood capped bottles. We provide periodically moving means to thus expand the clamps and release the bottles at the rotor hood-capped bottle discharge station, when the twin bottle support 30, has elevated to position to catch and support the bottles when thus released. In the example illustrated, this means comprises a normally elevated vertically movable presser head 34, overhanging the rotor 18, above its discharge station, and arranged to descend on and expand or straighten out the toggles of the mouths that have stopped at the discharge station and depress said toggles to locked positions, as hereinbefore set forth.

This presser foot or head 34, is carried by and normally fixed to a vertical reciprocatory slide rod 34a, extending downwardly into the gear case or housing with its lower end held to the working edge of rotary lifting cam 35, on shaft 36, by expansion spring means 37. The cam lifts the presser foot and holds the same normally elevated and controls the operative descent of said foot under the power of the spring means.

The final bottle feed or advancing device, of the example illustrated, is periodically movable to wipe the discharged hood-capped bottles from the twin bottle support 30, into the slideway B', and to advance the hood-capped bottles previously forced into said way, toward the machine discharge or delivery B.

As an example, we show for this purpose a horizontally and rearwardly projecting swing or radial arm 38, located above the table, and normally arranged with its free or wiping end in advance of the twin supports 30, and adapted to swing rearwardly and toward the discharge B, to wipe the two bottles one pushing the other from said support 30, and into contact with the row of bottles in way B', to advance all of the bottles toward discharge B, and to then make its return stroke to normal position clear of the support 30. This wiper or swing arm makes its operative or bottle advancing stroke while the twin support 30, is in normal depressed position and while the rotor is making a forward step. The radial arm 38, is fixed to and carried by a vertical rock shaft 38a, depending through the table and mounted in the gear case or housing, and there provided with spring means 38b, constantly tending to return the shaft and arm to normal position.

The shaft 38a, is rocked to swing the arm 38, on its operative stroke by upright swing lever 39, through the medium of drum 38c, fixed on the shaft and pull connection 38d, at one end attached to lever 39, and at the other end fixed to the drum to wind thereon and unwind therefrom.

Figure 5:
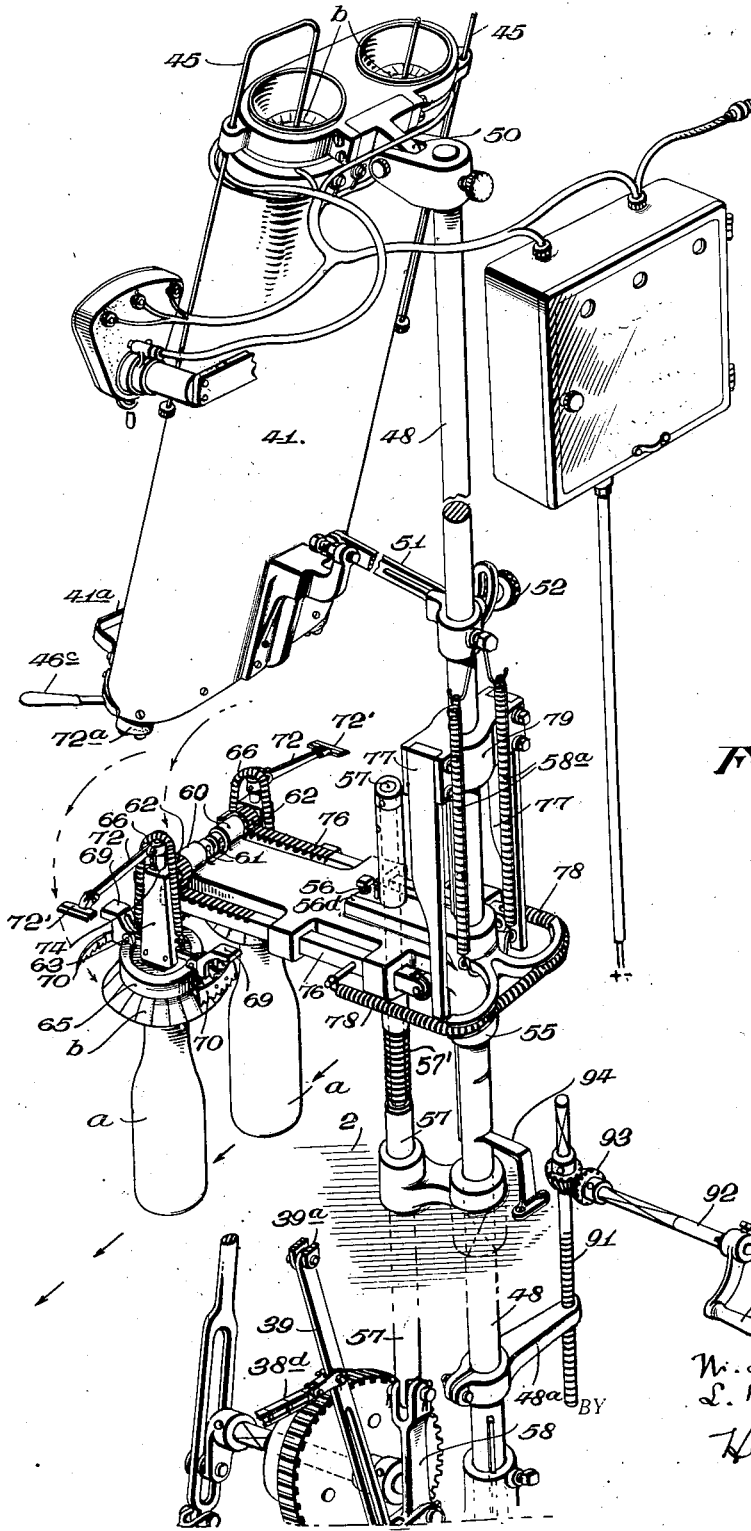
Fig. 5 is a detail somewhat diagrammatical perspective view of the cap transfer and, in part, its operating means, a pair of bottles being shown with the cap transfer in the act of depositing two hood cap disks thereon, the heater and holder for the supply of hood cap disks being shown swung forward from its normal operative position.
Figure 15:
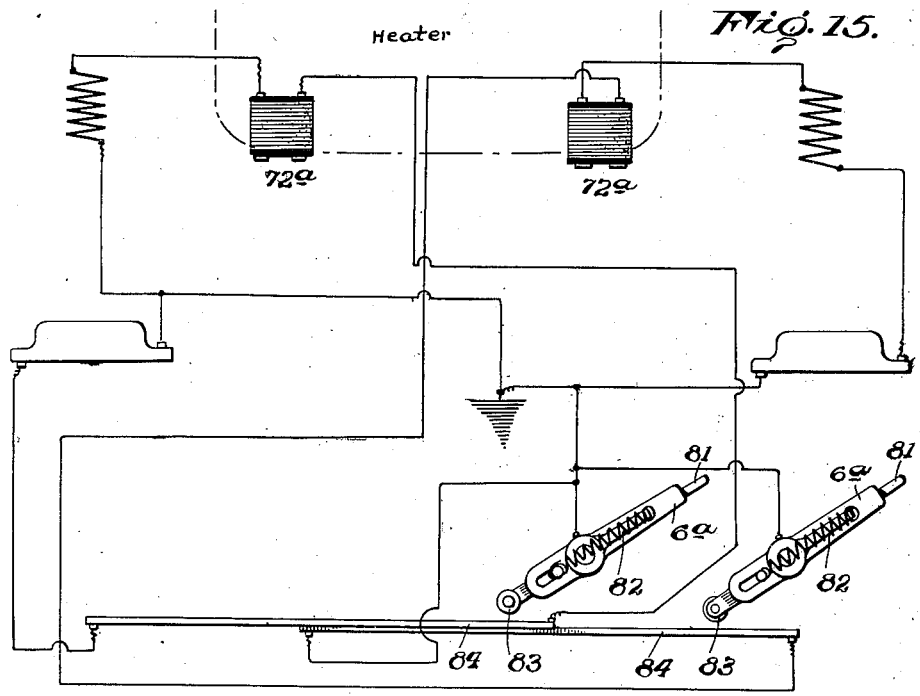
Figs. 15 and 16 show certain electric wiring diagrams for the bottle detector that controls the delivery of paper hood cap disks from the moldable hood cap disk supply.
Figure 16:
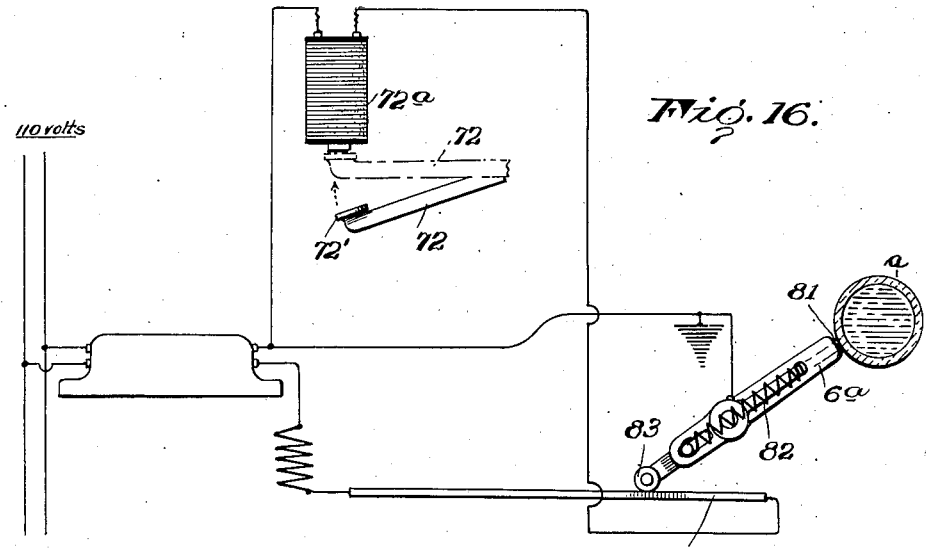

The lever 39, swings in a vertical plane and depends from pivot 39a, by which it is supported from a fixed part of the housing. The lower portion of the lever is longitudinally slotted. This lever depends to the rear of the rear end of rotary shaft 40, and is swung back and forth by shaft 40, through a suitable operative eccentric connection with said shaft. For instance, the shaft is provided with a rear crank 59, operatively connected to reciprocate slide rod 57, through the medium of pitman 58, swingable in a vertical plane and having a hub rotatably receiving the crank pin of said crank. This hub is provided with a lateral radial arm 39b carrying a pin extending transversely through the slot of lever 39, by which lever 39, is swung with pitman 58, by the rotating crank, during which the pin moves vertically in the lever slot as the pitman and its hub move vertically. This arm and said pin are shown by dotted lines in Figs. 3 and 4, and the arm is partially shown by full lines in Fig. 5.

*The supply of moldable hood cap disks*

The means for carrying a large supply of sheet paper material hood-cap binder-carrying disks and maintaining the same in hot moldable condition for quick delivery, in such condition, to the heads of the bottles, is arranged in an elevated position overhanging the bottle hood cap receiving station, namely, above the twin stools 7.

Broadly, this means is illustrated, described and claimed in our applications filed Sept. 25, 1925, Ser. No. 58,613, and filed June 23, 1926, Ser. No. 118,056.

In the particular example disclosed hereby, we provide an elongated container or box 41, having several (in this instance two) parallel longitudinal elongated separate similar feed tubes or magazines 42, exteriorly heavily insulated against heat exchange, and each open at its lower or discharge end or mouth, and also open or capable of being opened at its upper end for reception of stacks of sheet paper material binder-carrying hood cap disks to maintain the disk supply in the magazines. The container 41, is provided with and embodies any suitable heating means for maintaining within the feed magazines the necessary high temperature or temperatures to heat the hood cap disks therein to render the same moldable and to thus maintain the same for delivery in moldable condition. These binder carrying hood cap disks are preferably kept in a moldable condition by maintaining them approximately at the temperature at which the binder fuses or becomes approximately soft or fluid. In the example shown, the heating means consists of any suitable electrical heating formation, although we show electric resistance heating coils 43, arranged within the insulating container around the feed magazines, however we do not wish to so limit all features of our invention.

The feed magazines are formed to receive and feed down elongated stacks each consisting of a large number of preferably nested, previously formed sheet paper material hood caps with their creased annular flaring skirts, in this example projecting upwardly, and previously provided with and carrying and, preferably, secured together by the binder, which can be and preferably is high-melting point, quick-setting, rendering the paper normally stiff or hard and capable of stripping or peeling from the bottle surfaces. The temperatures at which the stacks of caps are maintained preferably causes desirable distribution of the binder on or in each cap and renders the caps separable from the stacks at the discharge mouths of the magazines, and preferably assures that each moldable cap delivered from the supply in the container carries the required amount of binder to cause setting and securing of the cap on the bottle head.

If so desired, although not essential to our invention, vertically movable pusher rods 45, can longitudinally enter the feed magazines through their upper ends and bear on the uppermost disks in the magazines, for manual operation to indicate when the magazines need reloading with fresh supplies of hood cap disks.

Each feed magazine, is equipped at its lower end or mouth, with means to uphold the stack of caps in the magazine and yet leave the mouth open for removal of the bottom caps in succession. For this purpose, we show each magazine mouth provided with an internal removable open-center retaining ring 46, of a diameter to more or less snugly fit up within the magazine and having several spaced upwardly projecting cap supports 46a, on which the bottom edge portion of the bottom cap in the magazine rests to uphold the stack of caps. Each ring 46, is provided with spaced depending radially projecting supporting ears 46b, one of which is radially projected to form a handle 46c. At its lower end, the container 41, is formed with several fixed spaced supporting brackets or ledges 46d, adjacent each magazine mouth and arranged to lock and uphold the rings 46, a distance upwardly within the magazine tubes, and to permit release and downward movement of either ring on partial rotation thereof by the handle 46c, to release the ears 46b, from the brackets 46d. The ring can be again inserted in the magazine and secured in the like manner by partial rotation in the opposite direction.

We attain advantages by the employment of a quickly removable and applicable cap support within the feed magazine mouth, as during the operation of the machine, situations sometimes develop rendering it highly desirable to quickly remove, examine, and reinsert, the hot caps through the magazine mouth.

The cap support is designed to hold the bottom cap up within and under the influence of the heat in the magazine, and yet so that the bottom cap is exposed and freely accessible to the cap transfer from below, and so that said cap can be freely stripped downwardly past and from said support particularly as the cap is soft and moldable and its skirt is distorted or flexed to clear the supports.

In the present example, the container 41, is supported and upheld in its overhanging position, by vertical post 48, extending down through the table and supported within the housing 3. We prefer to hang this container from supporting post 48, in such manner that the container is swingable vertically from its upper end to carry its lower end outwardly so that the discharge mouths of the magazines and parts adjacent thereto carried by the container will be readily accessible for various purposes. This movable mounting of the container also permits certain forward adjustments of the lower end of the container with respect to the hereinafter described cap transfer, if such be necessary, as means are provided for holding the container in position when thus adjusted. For instance we show hinge connection 50, between the rear portion of the upper end of container 41, and the upper end of supporting post 48, providing a horizontal axis on which the container can swing. An extensible slotted brace or link connection 51, is provided between the lower end of container 41, and supporting post 48, having clamping bolt 52, whereby said connection can be locked to hold the container in vertical or at the desired angular position. At the lower portion of its front, the container 41, can be provided with a handle 41a, by which the container can be pulled forward.

Various electrical connections, switches, and heat controlling and indicating devices, can be provided, as indicated by the drawings, all within the skill and province of those skilled in the electrical art, to supply and control the power current for the heating elements within the container 41, and to indicate and control the temperature with the hood cap feed magazines.

*Means for transferring moldable disks from the moldable cap supply to the heads of bottles at the cap receiving station*

The quick-acting cap transfer for extracting hood cap disks from the container 41, and placing them in moldable condition on the heads of the bottles on twin stools 7, included in the example illustrated, embodies, broadly, the single cap handling transfer shown, described and claimed by our patent application filed June 23, 1926, Ser. No. 118,056.

The instant case, however, discloses a quick-acting duplex cap transfer that is capable of simultaneously extracting two moldable hood cap disks from the twin or multiple feed and heating magazine, reversing the two disks and simultaneously depositing them right side up on the heads of two bottles located on the twin stool 7.

In this example, the cap transfer comprises a vertically reciprocatory carriage that embodies a vertical tube 55, slidable vertically on the post 48, that supports the container 41, and a horizontally disposed forwardly extending head or frame 56, rigid with said slide tube. This carrier 55, 56, is vertically reciprocated by a vertical slide rod 57, at its upper portion operatively connected to the carrier to raise and lower the same and depending therefrom in the gear case, through suitable guiding means, and actuated by pitman 58, connecting the lower end of the slide rod with actuating crank 59 of shaft 40 and having spring 57', to cushion the carrier frame 56, on its upward stroke.

At its front or outer end, the carrier frame 56, is formed or provided with the alined horizontal transverse bearing hubs 60, in which the respective horizontal alined rock shafts 61, of the two hood cap carrying heads are confined to rotate. Each rock shaft has a pinion 62, fixed thereto, and at its outer end a vertically disposed head 63. These two heads 63 are fixed to their shafts. Each head 63, is formed with a transverse bore or slide-way radially with respect to its shaft or axis 61, and the straight shank 64, of a hood cap receiving disk or head 65, is confined in and slidable longitudinally of said bore. The respective disk heads 65, are fixed to their respective shanks 64, and are located at corresponding ends thereof, and beyond corresponding ends of their respective carrier heads 63. The reciprocation of the disk heads 65, is limited in one direction by the adjacent end faces of the respective carrier heads, and in the opposite direction by stops 64', on the outer ends of their respective shanks. The disk heads 65, are yieldingly normally held at their limits of outward movement away from the adjacent ends of their respective carrier heads 63, by retractive springs 66. Each hood cap holding and carrying assembly of the twin cap transfer, embodies means to hold a hood cap centered on and against the outer face or side of its disk head 65, and such means, in the example illustrated comprises a pair of hood cap grasping and holding fingers. These fingers embody a pair of levers 67, between their ends pivoted in brackets 69, fixed to and arranged at the back side of the disk head, by parallel pins or axes 68. At its outer or free end, each lever is provided with a hood cap skirt grasping or gripping portion 70, while the opposite or inner ends of the lever are loosely fulcrumed or confined in sockets 71, in the opposite edges of the carrying head 63. These cap gripping fingers are arranged diametrically opposite each other with respect to their disk head 65, to swing in a common plane toward and from each other so that when the gripping portions 70, swing toward each other they can grasp a hood cap by its skirt and hold the cap with its center held pressed to the outer face of disk head 65, and when the fingers swing in the opposite direction the cap will be released.

The cap gripping fingers are opened and closed by relative movement between the head 63, and the slide that embodies disk head 65 and its shank 64. Said slide is normally held projected from head 63, with the gripping fingers in inoperative or separated position by an automatic detent or latch 72, pivoted at 73, to the stop 64', at the projecting inner end of shank, and having a lateral nose 74, adapted to abut the adjacent end face of carrier head 63, and hence hold the slide 64—65 withdrawn against the tension of spring 66, and with its disk head 65 spaced a slight distance from the opposite end of head 63. When gravity latch 72, swings to move its nose 74, outwardly clear of the adjacent end face of head 63, the slide 64—65, is released and free to move outwardly under the power of spring 66, and thereby project disk head 65, and in so doing cause the fingers to swing toward each other to grasp a hood cap between their holding ends 70.

These independent gravity detents have arms 72, elongated and weighted as by electro-magnet armatures 72', at their free ends. The cap transfer reciprocates vertically to and from the heads of the bottles standing on stools 7, and the discharge mouths of the twin cap magazine. When the twin cap transfer has grasped the two bottom caps from the twin cap magazine, it descends and reverses the positions of the two caps, and then deposits the caps, right side up, on the heads of the two bottles, respectively, and the bottle heads arrest downward movement of the disk heads 65, as the carrier 56, continues down with the heads 63 sliding down on shanks 64, against the tension of springs 66, thereby causing the capping fingers to swing outwardly to release the caps. When the carrier reaches its limit of relative downward movement with the lower ends of head 63, abutting the top faces of disk heads 65, the detents or latches 74, under the weight of their arms 72, are then free to automatically swing into locking position against the upper ends of heads 63, to hold the slides 65—64 in retarded positions. The transfer parts are then locked by the latches or detents, in these positions, when the cap transfer starts on its upward and reversing stroke to the discharge mouths of the twin cap magazine, the heads 63, first move up a slight distance on the stems 64 and from the top faces of disk heads 65, into abutting engagement with the detents 74, and thereupon carry up the disk heads 65, with their top faces spaced a short distance from the adjacent ends of heads 63, see Fig. 6. As the cap transfer nears the end of its return or upward stroke, the brackets 69, first engage the bottom end wall of container 41, and arrest continued upward movement of the two slides 65—64, with the disk heads 65, located in the lower ends of the magazine tubes and against the central depending ends of the bottom caps therein and with the out spread cap gripping fingers 67—70, also located up in the magazines opposite spaces between the supports 46a, for the stacks of reversed hood caps in the magazine tubes, with each bottom cap between a pair of such fingers. The cap transfer carrier heads 63, then continue upwardly on stems 64, for the short distance necessary to bring their upper ends against the adjacent back faces of disk heads 65, and relieve the pressure of springs 66, on the detents or latches 74, and thereupon by gravity the weighted arms of the detents drop carrying the locking noses of the detents outwardly from locking positions, thereby releasing the slides 65—64 and heads 63, for relative movement. The cap transfer carrier thereupon starts on its downward cap extracting and delivering stroke, the initial movement of which causes the fingers 67—70 to grip the bottom caps in the magazine, by reason of the relative downward movement of the transfer carrier including heads 63, with respect to slides 64—65 which are held to the lower end of container 41, by the springs 66. During this initial cap gripping movement of the transfer, the cap gripping fingers of the two sets swing upwardly and inwardly, grasping the bottom caps in the twin magazine by their skirts, compressing and distorting the skirts to separate them from the caps above and to press the cap centers down against the faces of disk heads 65. This initial downward movement is completed when the ends of heads 63, strike stops 64', whereupon the slides 65—64, move down with the carrier, the gravity latches or detents hanging freely, the caps being held by fingers 70—67, are thereby pulled and stripped down free of and past supports 46a, and from the twin magazines, for reversal and deposit on the bottle heads.

The twin cap transfer is reversed on its cap delivering and return strokes by rocking or swinging vertically on alined axes or shafts 61, mounted in the carrier. The twin transfers are held in the desired positions and are reversed at the desired points in the strokes of the carrier, by the reciprocatory sliding racks 76, in constant mesh with the toothed pinions 62, respectively, with their inner ends held in constant operative engagement with cam tracks 77, by retractive spring means 78. The cam tracks 77, are supported independently of the carrier 56, by a head 79, normally fixed to post 48. These two parallel tracks 77, are vertically arranged and have corresponding high and low portions that cooperate with spring means 78, to simultaneously reciprocate the racks to correspondingly and simultaneously rock the two heads 63, through approximately 180°. to and from positions with the disk heads 65 facing upwardly and facing downwardly. The two racks extend longitudinally of the carrier 56, and are confined thereto for straight line reciprocation with their inner ends bearing against the relative fixed tracks 77, throughout the path of movement of the cap transfer carrier.

Bottle detector for the cap transfer

We prefer to provide means to prevent the cap transfer (whether arranged to handle but one cap at a time or several caps at a stroke) from receiving and extracting a hood cap disk unless a bottle is present at the cap receiving station on which the transfer can deposit the cap. The cap transfer mechanism we have disclosed, requires the cooperating presence of a bottle at said cap receiving station, to bring about release of the cap deposited on the bottle head, and hence if a bottle is not present at said station, the cap carried by the transfer will not be delivered, but will be carried back and forth by the transfer until it finds a bottle to receive the same, by which time the cap may have become chilled and partially set, and furthermore, the transfer may have in the meantime picked up another cap from the cap magazine, on the cap then carried by the transfer.

In the particular example illustrated, we provide means to prevent the slide 65—64 of a cap transfer from being released by the gravity detent, to operate the cap grasping fingers on their cap grasping stroke, when a bottle has not been pushed onto the stool 7, to receive the cap from that transfer. For instance, in this example, we provide electromagnets 72a, to hold up the weighted arms 72, of the detents 74, and thereby prevent said arms from dropping by gravity to release the carrier from the slides 65—64 for relative gripping finger actuating movements, when said slides are up in cap securing positions in the magazine tubes. These magnets thus under abnormal conditions, act on the armatures 72', of the arms of the gravity detents to prevent releasing swing of the arms and detents, although under normal conditions said magnets are not energized and said detents and their arms are free to swing by gravity to releasing positions as hereinbefore described. When either or both detents of the twin cap transfer is or are thus held or prevented from dropping to releasing position, the cap gripping jaws thereof remain in spread-apart or inoperative position while the disk head or heads 65, merely press up the bottom cap or caps in the twin magazine, and then descend without extracting and taking down a hood cap disk. In this example, we accomplish this result, by providing the two bottle feeding or pushing fingers 6a, (of the feed that advances bottles in slideway A') that push the two bottles onto the two stools 7, at the cap receiving station, with electric circuit closers operated by contacting said two bottles to de-energize said two electromagnets, and, on the contrary, to cause said two magnets to be energized when the bottles are not present to operate the switches. For instance, we show the two feed fingers 6a, that push the bottles out of the stools 7, respectively, provided with relatively reciprocatory longitudinal slides normally held projecting beyond the bottle pushing ends of the fingers to form projecting contact ends 81, by retractive springs 82. The rear ends of these slides form normally withdrawn electric switch points or contacts 83, adapted to electrically engage an upright plate 84, of conducting material forming the opposing terminal of the electric switch common to both contacts 83, when either or both electric contact ends 81, is or are forced back by engagement with a bottle or bottles on either or both stools 7. Suitable electric wiring is provided, that includes the source of electric current, the magnets 72a, the sliding contacts 81, 83, the common electric terminal 84, and grounding or electro-magnet shunting connections, in such manner that when a contact 83, is not forced into electrical engagement with the terminal 84, the magnet 72a, corresponding to that contact 83, will be energized and prevent the cap transfer taking a cap for the bottle that should have been delivered to the stool 7, represented by that cap transfer. If either contact 83 is depressed into electrical engagement with plate 84, the corresponding magnet 72a, will be de-energized and the cap transfer will take up a cap for that bottle.

Each contact 83, represents a certain stool 7, magnet 72a, and corresponding cap transfer, and hence separate electrical circuits are provided for the magnets 72a, where the cap transfer is constructed to handle more than one hood cap. Hence, this feature of our invention is not limited to apparatus handling the bottles in groups of more than one bottle.

*Adjustments for runs of bottles of different sizes*

Means are provided whereby various assemblies and elements of the apparatus illustrated, can be variously set to adapt the machine to hood capping runs of bottles differing in size or capacity, such as quarts, pints, half pints, etc.

As bottles of different capacities vary in diameter, it is desirable to vary the position of the guide wall 5, of slideway A', and correspondingly vary the strokes of the feed slide 6a, of said slideway to assure the delivery of bottles, whatever their sizes within the capacity of the machine, properly positioned or centered on the bottle supports 7—7, and 8—8.

In the example shown, the longitudinal guide wall 5, is bodily slidable forwardly and rearwardly while maintaining its longitudinal position parallel with the slideway A'. This is accomplished by a parallel ruler arrangement of spaced parallel horizontal links 5a, arranged between said wall and at their front ends pivotally joined thereto and at their rear ends pivotally joined to pivot pins 5b, rising from the table top. One of these links 5a, constitutes a forwardly extending crank arm rigid with a vertical rock shaft 86, suitably mounted and supported in the gear case or housing and rising through the top 2. A horizontal rock shaft 87, is journaled within the housing 3, and provided with an operating handle 88, accessible at the exterior of the housing, and preferably movable along an index or scale 88a, having indicating marks for quarts, pints and half pints, or the like. This shaft 87, is operatively connected with shaft 86, as by crank arms 87a, 86a, and a connecting push and pull link 89, in such manner that the guide wall can be shifted forwardly or rearwardly by swinging handle 88, and the wall can be set for a run of bottles of a certain capacity by moving said handle to the indication for bottles of such capacity on said scale. The adjusting means is so arranged that when said handle is moved to the quart index or indication, for instance, the parts controlled by the handle will be set to handle or properly receive quart bottles, and so on with respect to movement of the handle to any other one of the indications of the index. This same handle 88, is utilized to set the bottle feed mechanism for slideway A', for bottles of different sizes, simultaneously with its action in setting guide wall 5, for bottles of the same size.

In the example shown, the feed mechanism slide 6, is reciprocated by upright lever 15, through the medium of pitman 14. This lever 15, is at its lower end, at 15a, fulcrumed to the free end of laterally projecting crank arm 87b, to swing vertically, and this crank arm 87b, is fixed to and swung vertically by the shaft 87, that is rocked by handle 88. The lever 15, is formed with a longitudinal slot 15b, receiving the crank pin of crank 40a, rigid with and rotated by shaft 40, to swing lever back and forth on its operative strokes. Obviously, by rocking shaft 87, through its handle, the fulcrum of lever 15, will be raised or lowered with respect to the circle in which the crank 40a, rotates, and the stroke of the lever will be correspondingly increased or decreased and the stroke of the feed slide 6, will be increased or diminished to correspond with the diameter of the run of bottles to be operated on.

The heater and container 41, for the supply of moldable hood cap disks, is vertically adjustable to accommodate bottles of different vertical lengths, such as quarts, pints, and half pints, etc., and, in this instance, said container and parts carried thereby can be set at any one of several elevations, by vertically moving the post 48, that carries said container. If so desired, nut and screw means can be provided for this purpose, manually operated by handle 90, accessible at the exterior of the machine housing. Within the machine housing, the vertically slidable post 48, has a lateral supporting arm 48a, fixed thereto and this arm 48a, has an internally screw threaded bore extending vertically therethrough so that the arm in effect forms a non-rotary nut. A vertical screw threaded shaft 91, is mounted in the housing against substantial vertical movement, and the threaded portion of this shaft extends through and meshes with said bore or nut so that rotation of shaft 91, will raise or lower post 48, and its load while the screw and nut means will hold the post and its load at the elevation to which adjusted. The exterior handle rotates and is carried by rotary shaft 92, mounted in the frame or housing and geared at 93, to screw shaft 91 to rotate the same in either direction. In order to indicate to the machine operator, the different elevations of the container 41, necessary for bottles of different sizes or capacities, a spring arm or detent 94, can be fixed on the table 2, with its free end bearing against post 48, to snap or clip into notches formed in said post at different elevations, say to indicate the different elevations of the container 41, for quarts, for pints and for half pints, for instance.

The cap transfer carrier 56, is preferably carried vertically with the post 48, through the medium of expansion spring means 58a, by which said carrier is suspended from said post, in such manner that said spring means yieldingly upholds said carrier and the carrier moves on its downward cap delivering stroke against the tension of said spring means. Relative vertical adjustment of the cap transfer reciprocating slide 57, and the cap transfer carrier 56, is provided for by a vertical series of notches in slide 57, indicating quarts, pints and half pints, for instance, and means 56d, mounted on carrier 56, to enter any one of said notches when securing said slide to the carrier to correspondingly raise or lower the elevations at which the transfer receives and delivers caps.

The hood capped bottle carrier or rotor 18, is also capable of being quickly shifted to the required elevation to handle bottles of quart size, or pint size, or half pint size, for instance. In the example shown, this result is attained by providing the rotor with a supporting sleeve 18d, fixed thereto and receiving and normally clamped to the rotor shaft 19, and rotating therewith but capable of sliding vertically thereon, when the clamping bolt or nut 18e, is loosened, under the action of rotary nut 19d, (having hand wheel 19e) adjustable vertically on the screw threaded portion 19f, of shaft 19. The lower end of sleeve 18d, rests on nut 19d, and the vertical position of the sleeve and rotor 18, is determined by the vertical position of the nut 19d.

If so desired, bottle size indications or index marks can be visibly arranged along the vertical slot in sleeve 18d, through which the clamp 18e, extends to show the elevations at which the rotor should be held to operate on the bottles of different sizes, such as hereinbefore mentioned.

The presser head 34, for releasing the successive groups of hood capped bottles from the carrier or rotor 18, for taking off at the bottle discharge station, is also vertically adjustable to accord with the different elevations at which the rotor can be set. For instance, we show the presser head 34, capable of vertical adjustment on its operating and carrying vertical slide rod 34a, to any one of three positions for bottles, say of quart, pint and half pint sizes, defined by notches 34d, in said rod to receive the clamping or securing means 34e, by which said presser head is normally fixed to said rod.

*Actuating and timing mechanisms for various operating parts*

In the example illustrated, the power for the operating parts of the machine is furnished by a motor M, geared to drive the rotary main drive shaft m, preferably through a slip clutch connection m'. The main shaft m, drives the rotary longitudinal shaft 11, through a suitable longitudinal shaft and gearing that includes a clutch mechanism n. The longitudinal shaft 11 carries and drives the cam 10, that actuates the bottle delivery twin elevator 8. This continuously rotating shaft 11, is geared to and drives the Geneva movement or star wheel mechanism s, that drives the bottle carrier or rotor 18, on its step by step rotation with intervals of rest, in such manner that the proper timing is maintained to assure elevation of the twin elevator 8, during each interval when said carrier is at rest after each advancing step.

The cross shaft 36, is geared to and rotated by the longitudinal shaft 11, and this shaft 36, carries and rotates the cam 35, controlling and timing the movements of the bottle releasing presser head 34, in such manner that said head makes its operative stroke during each interval of rest of the bottle carrier 18.

This shaft 36, is preferably extended to the exterior of the machine housing and there provided with an accessible handle 36a, by which the shaft can be rotated by hand to manually set or move the various operative parts of the machine, as through one or more operative strokes thereof, in case of need. This hand operation of the machine for a short period, can be accomplished when the operative parts are thrown out of gear with drive shafts m, and the motor, by operation of the clutch n, as through the medium of handles C, at the exterior of the machine housing and carried by and fixed to clutch operating rock shaft C'.

The shaft 40, is geared to and constantly rotated by the shaft 36, to actuate the bottle feed slide 6, the hood capped bottle feeding wiper arm 38, and the cap transfer mechanism in timed relation so that the arm 38, makes its feeding and quick return stroke while the twin receiving bottle supports are in lowered position and the bottle carrier 18, is advancing a step, and so that the slide 6, is moved on its bottle feed stroke while the twin elevators 8, are in lowered position, the cap transfer is elevated from the bottle cap receiving station and the bottle carrier 18, is making an advancing step, and slide 6, is making its return stroke while the bottles are receiving caps and the carrier 18, is at rest to receive and discharge bottles, and so that the cap transfer will be on its upward stroke while the slide 6, is on its bottle feeding stroke, and on its cap securing and downward cap delivering stroke while bottles to receive caps are at rest on the twin stool 7.

The longitudinal shaft 33, carrying and rotating cam 32, that controls the ascent and descent of the twin bottle supports 30, is geared to and constantly rotated by the shaft 36, to time the ascent and lowered position of said supports 30, to move up and receive bottles from carrier 18, at each interval when that carrier is at rest, and to remain in lowered position while wiping arm 38, is making its operative and return strokes.

In the example illustrated, the operating transmissions are housed, mounted and enclosed within the machine housing or case 3, which can embody a heavy base portion and a somewhat smaller upper portion under the table 2.

*The hood capping method*

The filled bottles a, to be hood capped, are usually closed by the common or other removable paper closure disks c, (Figs. 12, 13) fitted down in the bottle mouths.

The heating container 41, is designed to receive, carry and feed to its discharge for preferably successive delivery, a great multiplicity of paper material flaring skirt binder carrying hood cap disks b, and is equipped with heating means to maintain such large supply of paper disks b, in moldable condition from which large supply, moldable hood cap disks are extracted as required and deposited on bottle heads in such manner as to be centered on the top edges of the bottle heads with the annular hot moldable longitudinally creased or tucked skirts of the disks b, depending or diverging downwardly. These moldable disks on the bottle heads are quickly subjected to downward pull and to forces that gather the disk skirts downwardly and inwardly and annularly and diametrically contract the skirts to and under the bottle head rims with the surplus material taken up by longitudinal folds, tucks or creases, and press them circumferentially and radially to securing positions against the bottle surfaces, closing the folds or tucks together and preferably compressing them, and thus hold the caps for more or less extended lengths of time during the cap skirt cooling and setting process and until the creased or folded skirts have set. When this process is completed and said skirts have set to permanent stiff securing condition and in securing position, the pressure of said forces is released. The bottle heads will then be covered by the set secured hood caps b', having the folds of their stiff set skirts secured down in stiff flat form, with said stiff skirts snugly hugging the bottle rim and bottle contraction thereunder and possibly sealing thereto and completely around the same and with the top wall of the cap closely hugging the top edge of the mouth. To remove the hood cap thus secured, force must be applied to the skirt thereof to break the stiff ring formed by the skirt, by forcibly expanding the same and stripping the skirt from the bottle surface as the cap is rocked up from the bottle mouth.

The depressing, folding and radially and circumferentially annular pressure applied to the moldable skirt of the paper hood cap disk centered on the bottle head exerts downward pull on the cap to draw the cap top tightly down to and across the bottle mouth and then said cap top is pressed down tightly against said bottle mouth during the completion of the operation of flattening out and contracting and radially and circumferentially pressing the skirt, and the cap top as well as the skirt are thus held under pressure during the cooling and setting process, while the bottles are being carried forward to their ultimate destination.

The hood cap disks b, are cut from sheet paper material and are drawn by dies or otherwise produced in the annular flaring skirt form, and the machine producing these hood cap disks can discharge the same nested together in a long stack or column. Usually these nested caps are handled in stacks, say several hundred disks to a stack, and are thus subjected to the binder in hot liquid form, so that each stack will absorb and take up the required quantity of the liquid binder to subsequently supply each disk of the stack, when separated therefrom, with the required amount of binder for securing and waterproofing purposes. The stack of binder treated nested caps after cooling and setting will usually carry binder securing together the caps at their edge portions with the skirt portions of the caps of the nest more or less impregnated and more or less coated with binder, so that the stack of disks will be more or less exteriorly hard and can be handled as a block or unit, although we do not wish to so limit our present invention.

Various binder materials or compositions can be employed such as sulphur, or waxes or compositions. We usually employ a high melting point, quick setting binder, that preferably does not cause the paper caps to deposit objectionable deposits on glass, and permits the binder carrying paper to strip or peel from glass where of a character to seal against glass when the cap is applied according to our method. However, in some instances our method can be carried out where the hood cap paper disks are throughout impregnated and/or coated with and/or by the binder material that renders the paper water resistant and capable of becoming soft and moldable when heated to approximately fuse the binder and by cooling and setting to become hard or stiff for securing purposes, and in fact we might employ hood cap disks made of sheet paper material carrying binder for our purposes introduced into the paper during the process of making the paper or introduced into or applied to the paper before the hood cap disks are cut therefrom and formed into the flaring or other skirt form.

The binder carrying sheet paper material disks, are supplied for hood capping purposes, in previously formed annularly skirted hood cap shape, preferably with flaring skirts. As at present advised by experience, we prefer to employ these previously skirted hood cap disks in multiples or large numbers secured together in stacks and thus handled as units, and to apply the softening heat to one or more of such stacks to approximately fuse the binder and cause distribution thereof to all of the disks and along the securing portions of the skirts thereof, to render the disks moldable and easily and quickly separable from the remaining disks for successive extraction and quick deposit on the bottle heads. We prefer to maintain a large supply of these disks in separable moldable condition and to separate and remove the disks successively from one end of the stack and permit the stack to feed down by gravity or otherwise as the disks are removed, and to replenish the supply of disks from above as the moldable disks are removed. In view of the quick operation necessary, we gain decided advantages by heating up a large number of such disks so as to build up and keep on hand, during the capping operation, a large supply of disks in moldable condition in the feed magazine for rapid discharge at the bottle capping position, thereby avoiding the slow delaying operation where it is necessary to feed the disks one at a time from a cold supply to the bottle capping station and heat the disks one at a time while passing from the cold supply to said station, particularly as heating a disk to render it moldable is a more or less slow time consuming operation.

In the method of arranging and feeding the stacks of moldable flaring skirt hood cap disks to the moldable disk discharge or delivery, we overcome difficulties and gain advantages, by advancing the disks in reversed or upside down position, namely, with all the disks arranged with their closed centers in front and their skirts flaring rearwardly, or as in the particular example shown diverging and flaring upwardly and outwardly. Where the heater and container for the supply from which the moldable disks are dispensed, embodies a long vertical feed magazine having a bottom discharge from which the bottom disks of the stack are dispensed and to which the stack feeds downwardly, we find that the stack feeds or settles down accurately, quickly, and freely its full distance and without wedging or sticking and that the bottom end caps will be accurately located and can be easily separated from the stack and stripped from the magazine, and the caps under the weight of those above do not tend to objectionably spread and increase in diameter, where the caps are arranged in reversed position with their skirts diverging and flaring upwardly. In this connection, it must be remembered that the cap skirts are soft and readily distorted under the sustained high temperature and that the lower caps of the stack carry the heavy weight of the large number of caps above and hence will be subject to possible distortion and spreading with increase of diameter and wedging against the magazine walls, and also that cap dispensing and extraction difficulties will result because of flattening or variations in the form of the bottom caps, where the caps are arranged right side up or with their skirts diverging downwardly.

In the practice of our method, we find it to be highly desirable to maintain aproximately uniform temperatures in the hood cap disks supply and feed magazine, sometimes over comparatively long lengths of time, where the hood capping is carried on for long runs of thousands of bottles at high speed and with more or less frequent interruptions, and to so regulate the temperatures as to maintain the disks of the supply in the desired moldable condition without deterioration of the paper by excessive temperatures, and particularly to so distribute and apply the heat as to maintain the end disk at the dispensing station within the hot zone and in the desired moldable condition for dispensing to the container heads.

We also gain advantages by constantly keeping up a large reserve supply of the hood cap disks in the heating and dispensing feed magazine, particularly during high speed capping of long runs of bottles, and as an aid in gaining this result, we preheat the fresh supplies or stacks of nested disks before inserting them in the upper end of the feed magazine to replenish the supply therein. We usually employ a separate oven or heating chamber (not shown) in which, during hood capping operations, we maintain a large supply of the stacks or units of hood cap disks for subsequent use in periodically replenishing the supply in the feed magazine by the insertion therein of preheated or hot disks, to reduce the heat energy taken up from the magazine by the fresh disks inserted therein and to hasten the time necessary to reduce the replenished disks to the desired moldable condition in the feed magazine. This preheating step, preferably, is not carried on at as high temperatures as are carried in the feed magazine, and, preferably, does not render the fresh supplies of disks in a moldable condition when used to replenish the supply in the feed magazine, but the preheated disks are sufficiently hot to reduce the work required of the feed magazine and speed the operation of the feed magazine in reducing the disks to the desired moldable condition.

It will be observed that the moldable disks are applied to the chilled surfaces of the filled bottles, and that the clamping or molding and holding rings are cold when applied to the hot skirts of the disks on the bottle heads. It will also be understood that the mechanisms illustrated will function in advancing one bottle at a time to and from the hood capping position, and to and from the bottle carrier or rotor, and will apply one cap to said bottle and will clamp the cap on said bottle and thus hold the same throughout the travel of said carrier and then discharge the same, and hence all features of our invention are not limited to mechanisms for handling bottles in groups, and it is also obvious that various modifications, changes or variations might be resorted to, and that features or assemblies might be added, or features and/or structures might be omitted without departing from the spirit and scope of our invention.

What we claim is:—

1. In the method of hood capping bottles, those steps which comprise arranging a stack of binder-carrying paper material flaring skirt hood cap disks with their skirts flaring rearwardly and their centers to the front; heating said caps to render their skirts moldable and to maintain a supply of said moldable hood cap disks; dispensing moldable caps from the front end of the stack to bottle heads; causing the stack to feed forwardly as caps are removed therefrom; and contracting the moldable cap skirts to securing position on the bottle heads.

2. In the method of hood capping containers, those steps which comprise providing a stack of nested flaring annular skirt binder carrying paper material hood cap disks arranged with their skirts directed upwardly, and causing the stack to feed downwardly; heating said disks to render their skirts moldable and thus maintaining a supply of such moldable disks; and successively separating and removing moldable disks from the lower end of the stack and reversing the disks and applying them right side up to container heads for molding thereon.

3. In the method of hood capping container heads, those steps which comprise feeding flaring-skirt binder carrying paper material hood cap disks forwardly while in upside down position; subjecting said disks to skirt softening temperature; and successively dispensing the front moldable skirt disks and applying the same right side up to container heads for securing the same thereon by setting of the disk skirts.

4. In bottle capping apparatus, in combination, means to successively advance groups of bottles to a cap receiving station and therefrom to a bottle delivery station; periodically movable means to simultaneously deliver caps to all of the bottles of each group while at said cap receiving station; and bottle moving means to successively move the groups of bottles from said delivery station and to successively discharge the groups of capped bottles at a discharge station, said bottle moving means embodying series of groups of mouths, each group of mouths adapted to simultaneously receive each cap carrying head of each bottle of a group and advance with the group.

5. Apparatus for hood capping containers comprising applying means for simultaneously applying moldable hood cap disks to all of the heads of a group of bottles; bottle advancing means for delivering all of the hood-cap-disk carrying bottles of said group at a delivery station; and bottle conveying means for receiving said group of bottles from said station and carrying the same forward and discharging the same at a receiving station, said conveying means embodying series of groups of bottle head receiving and hood cap disk forming and pressing devices, said groups of devices adapted to successively receive groups of bottles from said delivery station and shape the disks on the heads of the bottles to securing hood cap form and thus hold the same until discharged at said receiving station, whereby the bottles are advanced and hood capped in groups.

6. In combination; means for simultaneously delivering and centering moldable hood cap disks on the heads of a group of bottles; and bottle conveying mechanism adapted for successively receiving groups of said bottles carrying said moldable disks and advancing a multiplicity of said groups and discharging said groups successively in the order that they were received; said conveying mechanism embodying successive groups of moldable hood cap disk contracting and pressing devices having controlling means.

7. Apparatus for hood capping bottles, comprising upright bottle conveying mechanism adapted to receive bottles in succession and deliver hood capped bottles in succession and to simultaneously advance a multiplicity of such bottles in normal upright position between the receiving station and the delivery station, said conveying mechanism embodying a succession of bottle head receiving hood cap skirt contracting and pressing devices and controlling devices therefor for opening the same to receive the heads of bottles carrying moldable hood caps thereon and for releasing hood capped bottle heads therefrom, and for causing the same to close on and mold the hood caps on the bottle heads, whereby the skirt of the hood cap disk on each bottle advanced will be first contracted and pressed to securing position on the bottle head and then thus held pressed to securing position during the hood cap cooling and setting process, and whereby said mechanism will simultaneously advance a multiplicity of bottles with their hood caps thus held pressed to securing position, and deliver bottles with their hood caps set in secured position as fast as said mechanism receives bottles for hood cap shaping and holding.

8. Apparatus for capping bottles, comprising bottle advancing means for simultaneously conveying a multiplicity of bottles and delivering them at a delivery station as rapidly as said means receives bottles at a receiving station; means to successively deliver sets of several bottles in a row at said receiving station, said bottle advancing means embodying a succession of sets of several bottle head receiving mouths arranged to be successively brought into alinement with the bottles of the sets at said receiving station, each set of bottle mouths adapted to simultaneously receive the bottle heads of a set of bottles at the receiving station and to simultaneously release the bottle heads of said set at the delivery station; and cap dispensing means for simultaneously delivering cap disks to each bottle of a set and to the sets in succession.

9. Bottle capping apparatus; comprising means for delivering cap disks to the heads of successive groups of bottles; a bottle feed for successively advancing the groups of bottles that carry said caps to a delivery station; and a bottle conveyer adapted to successively receive groups of bottles from said station and simultaneously advance a multiplicity of groups of bottles and successively deliver said groups at a discharge station, said conveyer embodying a rotor having an endless succession of groups of bottle head receiving mouths brought successively into alinement with said delivery station and with said discharge station, the mouths of each group arranged radially with respect to the axis of rotation of the rotor, said delivery station also arranged radially with respect to said axis.

10. Bottle capping apparatus, comprising a bottle feedway embodying a closure cap receiving station and a bottle delivery station; means overhanging the cap receiving station to deliver caps to a bottle at said station; said delivery station providing a bottle elevator; a bottle feed for successively advancing bottles along the feedway to said cap receiving station and therefrom to said elevator; a bottle conveyer overhanging said elevator for successively receiving bottles from said elevator and advancing the bottles throughout an elongated path of movement to a bottle discharge, said conveyer adapted to simultaneously advance a multiplicity of bottles between said delivery and discharge stations; and actuating and timing mechanisms for said cap delivering means, said bottle elevator, said bottle feed and said bottle conveyer.

11. A bottle capping machine comprising a bottle conveyer embodying a rotor having a continuous series of groups of bottle head receiving mouths, the mouths of each group being arranged radially with respect to the axis of rotation of the rotor, in combination with a delivery station for a group of bottles, said station arranged radially with respect to said axis of rotation and arranged with respect to said rotor so that said groups of mouths are successively brought into alinement with the bottles at said station, and means to successively advance groups of bottles to said station.

12. A machine for hood capping bottles comprising an elevated hood cap disk container providing several hood cap disk feeding magazines to receive hood caps in reversed or upside down position and means for heating the magazines to maintain hood cap disk softening temperatures therein, a cap transfer and turn over mechanism to simultaneously remove several caps from said magazines and turn said caps over and deposit said caps right side up simultaneously on several bottle heads, and actuating connections for said cap transfer.

13. In a machine for hood capping bottles providing a station at which the bottles receive hood cap disks in condition for securing thereon, an elevated hood cap feed magazine having a bottom cap dispensing mouth provided with an open center removable support for the stack of caps in the magazine, and means whereby said support is capable of quick release and removal from the magazine mouth.

14. A machine for hood capping bottles providing a station at which the bottles receive hood cap disks, and comprising an elevated magazine for a stack of hood cap disks and embodying means for heating the same, an upstanding vertically adjustable support for said magazine, said magazine being movably mounted on the support and capable of swinging outwardly therefrom to abnormal position.

15. A machine for hood capping bottles providing a station at which the bottles receive hood cap disks, bottle feed mechanism for advancing bottles to said station; a hood cap disk dispensing magazine; a periodically movable cap transfer mechanism for receiving caps and depositing them on the bottles at the station, said transfer embodying relatively movable means carried back and forth by said transfer mechanism, for extracting caps from the magazine; said cap extracting means being normally operative to extract a cap from the magazine on each operative stroke of the transfer mechanism and deposit the same at said station; and bottle detecting means controlling said cap extracting means to prevent operation thereof on the absence of a bottle at said station without interfering with the periodical movements of said transfer mechanism that carries said extracting means.

16. A machine for applying hood caps to bottles, comprising hood capped bottle conveying mechanism embodying a succession of bottle head and hood cap grasping devices each embodying a lock to hold the same in open position and tripping means for releasing the same for grasping the bottle head, said tripping means having an operating member to contact and operated by the hood cap on a bottle mouth, thereby constituting a hood cap detector, whereby the trip will not be operated except where a hood cap is on the bottle.

17. A machine for hood capping bottles comprising a conveyer for hood capped bottles embodying a rotor provided with a succession of bottle head grasping devices having means whereby the devices successively grasp the bottles at a receiving station; periodically operating means for causing said grasping devices to release the bottles at a discharge station, and a periodically vertically movable bottle stand for receiving the bottles at the discharge station.

18. A machine for hood capping bottles comprising a bottle conveyer having bottle grasping means for successively grasping bottles at a receiving station and for successively discharging said bottles at a discharge station; a bottle slideway at the discharge station having means to elevate and receive the bottles at the discharge station and then descend to the slideway, and a periodically movable wiper arm for removing the bottles from said means and advancing the same in the slideway.

19. Bottle capping apparatus comprising a capped bottle delivery station and an uncapped bottle path leading therefrom; feed means for advancing capped bottles to said station and for moving uncapped bottles therefrom to said path; a capped bottle conveyer for receiving capped bottles from said station and delivering the same at a discharge station, said conveyer embodying a series of bottle grasping devices each embodying means whereby the grasping device is closed to grasp a bottle and opened to release a bottle and a cap detector whereby each device refuses to grasp a bottle unless a cap is present thereon.

20. Bottle capping apparatus comprising a cap receiving station for the bottles, dispensing means for delivering caps to a succession of bottles at said station embodying means whereby a cap is dispensed for a bottle only when that bottle is present at said station and whereby a cap is deposited by said means only by the cooperating action of a bottle at said station, said means including a bottle detector that contacts with and is positively moved by each bottle while being moved to said station for capping; and means including said bottle detector for successively moving bottles to said station for capping.

21. A machine for hood capping bottles, capable of being set for runs of bottles of different capacities and sizes; said machine comprising a bottle feedway having a longitudinal guideway and manually operated means for shifting the position thereof; a feed mechanism for advancing bottles along said way, provided with manually controlled means for accommodating the same to bottles of different sizes; hood cap disk supply and transfer mechanisms provided with manually controlled means for setting the same at different elevations; a hood capped bottle conveying rotor provided with means for setting the same at various elevations; and driving and timing transmissions for said bottle feed mechanism, disk transfer mechanism, and rotor.

22. A bottle hood capping machine, comprising a bottle feedway providing a cap receiving station and a periodically-movable bottle elevator; a feed for advancing bottles step by step to said station and therefrom to said elevator; a step by step rotor for receiving bottles in succession from said elevator and conveying the same to and discharging the same at a discharge station; a periodically movable bottle releasing member for causing discharge of bottles from the rotor to the discharge station; a vertically movable bottle support periodically movable upwardly to receive the bottles discharged at said station; a periodically movable bottle advancing member to remove the bottles from said support; a power shaft; and timing and actuating transmissions driven by said shaft for operating said elevator, feed, rotor, releasing member, bottle support, and bottle advancing member.

23. In a machine for conditioning binder-carrying or plastic hood caps and for hood capping bottles therewith, while in a temporarily moldable or plastic condition; in combination; means for rendering binder-carrying or plastic hood caps temporarily moldable and for maintaining a multiplicity of said caps in such temporarily moldable condition to provide a supply of such temporarily moldable caps with flexible annular skirts for quick successive delivery; and a quick-acting turnover transfer mechanism for removing caps one by one from said supply and quickly depositing the same on bottle heads one by one while still in a temporarily moldable condition, said cap turnover transfer mechanism movable back and forth between said supply and said bottle heads.

24. In combination; a magazine for a stack of nested flaring annular skirted flexible paper hood caps having closed centers or tops and for guiding and feeding said caps toward an end discharge opening; means being provided for upholding the end cap in said magazine at an elevation above said opening; and a cap transfer movable into and from said magazine and therefrom back and forth to and from a cap delivery point to successively remove the magazine end caps and deliver the same at said point, said transfer including cap-fitting means to enter said magazine through said opening and fit and press upwardly against the center of the end cap, and means whereby the end cap center is held to said cap fitting means and the cap is thereby stripped downwardly from said magazine and transported to and released at said delivery point.

25. In bottle capping machinery for conditioning binder-carrying or plastic annularly skirted hood caps to render them temporarily plastic or moldable and for hood capping bottles therewith; in combination; a chamber wherein a multiplicity of annularly skirted binder-carrying hood caps are advanced toward a discharge; means for heating said multiplicity of caps in said chamber to provide a supply of said caps in a temporarily moldable condition for successive presentation at said discharge; and a quick-acting temporarily moldable hood cap transfer for successively removing temporarily moldable hood caps one by one from said discharge and transferring the same to and seating them right side up on bottle heads at a hood cap receiving station, while in a still moldable condition, said transfer being movable back and forth between said discharge and said station.

26. Means for delivering a succession or supply of annularly skirted plastic hood caps successively up-side down at a discharge in a temporarily moldable condition with their skirts flexible; means for advancing a succession of bottles to successively receive on their heads temporarily moldable plastic skirted hood caps; a succession of advancing molding and holding means for successively receiving the heads of said bottles carrying said still temporarily moldable hood caps and for shaping the same thereon to secured form and thus holding the same while advancing; and a cap transfer for taking temporarily moldable skirted hood caps one by one from said discharge and turning the same over and depositing the same right side up while still moldable on and depending around said bottle heads, one by one, before said bottle heads are received by said respective molding and holding means.

27. Apparatus for exteriorly covering bottle heads with flexible paper hood caps having depending binder-carrying flaring annular skirts, said apparatus embodying a feed and holding magazine for and adapted to uphold a stack of said binder-carrying skirted hood caps in reversed position with their skirts extending upwardly, said magazine adapted for the free downward feeding of the stack of reversed caps to a discharge mouth; means for heating said stack to provide and maintain a supply of hood caps having temporarily moldable skirts; said apparatus providing a station to which successive bottle heads and successive hood caps right-side up with their temporarily moldable skirts depending are brought together; and mechanism including cap reversing means for sucessively withdrawing reversed hood caps having temporarily moldable skirts through said discharge mouth and conveying said caps to said station while turning said caps over and delivering the same right-side up at said station.

28. In bottle capping apparatus, in combination; a series of downwardly-opening bottle head receiving and centering mouths each adapted to receive the head of an upright bottle carrying a hood cap having a flexible downwardly flaring skirt and to gather said skirt downwardly as the bottle head moves upwardly in said mouth; annular bottle supporting and hood cap skirt gathering and pressing expansible and contractile heads associated with said mouths respectively, and each when expanded adapted for the upward passage of a bottle head and hood cap therethrough and when contracted to gather and press the hood cap skirt against the bottle head below its rim and to thus uphold the bottle by its head; supporting and conveying means for said mouths and their associated heads; mechanism for actuating said conveyer means for advancing said mouths and associated contractile heads in an endless circuit; means whereby said contractile heads are closed to bottle supporting condition against the hood cap skirts and bottle heads; means whereby said contractile heads are expanded for reception of bottle heads and for downward release of hood capped bottles; vertically movable bottle supporting means to receive and lift successive bottles into successive mouths and to receive and descend with hood capped bottles from said mouths; and actuating mechanisms.

29. In bottle capping apparatus, in combination; a rotor provided with an endless series of bottle head centering and hood cap skirt contracting mouths, each provided with a hood cap skirt pressing expansible and contractile clamp; means whereby said clamps are expanded for the passage thereinto of a bottle head carrying a flaring skirted hood cap and for release of hood capped bottles; means whereby said clamps are contracted to hood cap skirt pressing condition; vertically movable devices for elevating successive bottles to carry their heads and flaring hood cap skirts into successive mouths and clamps and for carrying hood capped bottles down from expanded clamps and their mouths; and mechanisms for rotating said rotor and actuating said devices in timed relation.

Signed at Fulton, Oswego county, New York, this 6th day of December, 1927.

WILBUR L. WRIGHT.
LEE D. PIERCE.